United States Patent [19]

Bonnard

[11] 4,384,864
[45] May 24, 1983

[54] SELECTOR FOR A BICYCLE DERAILLEUR AND DERAILLEUR EQUIPPED WITH SUCH A DEVICE

[75] Inventor: Pierre Bonnard, Beynes, France

[73] Assignee: Agence Nationale de Valorisation de la Recherche (ANVAR), Neuilly sur Seine, France

[21] Appl. No.: 110,241

[22] Filed: Jan. 7, 1980

[30] Foreign Application Priority Data

Jan. 12, 1979 [FR] France ................. 79 00710

[51] Int. Cl.³ ..................... B62M 9/12; B62M 25/04
[52] U.S. Cl. .......................... 474/82; 74/142; 474/80
[58] Field of Search ............. 74/141.5, 142, 143, 74/473 R, 473 P, 474; 254/108, 109, 110; 474/78, 80, 82

[56] References Cited

U.S. PATENT DOCUMENTS

| 1,742,361 | 1/1930 | Linaker et al. ............. 74/142 |
| 2,431,513 | 11/1947 | Schwinn .................. 474/80 |
| 2,498,914 | 2/1950 | Correll ................... 74/474 |
| 2,552,371 | 5/1951 | Erickson ................. 254/190 |
| 2,693,116 | 11/1954 | Juy ...................... 474/80 |
| 3,303,711 | 2/1967 | Karecki et al. ............ 474/80 |
| 3,800,614 | 4/1974 | Johnson .................. 74/143 |
| 3,941,008 | 3/1976 | Cambria .................. 74/143 |
| 3,974,707 | 7/1976 | Nagano . | |
| 4,037,484 | 7/1977 | Morse .................... 474/82 |
| 4,055,093 | 10/1977 | Ross ................... 74/473 R |
| 4,198,873 | 4/1980 | Nagano et al. ............ 474/82 |

FOREIGN PATENT DOCUMENTS

| 1233296 | 1/1967 | Fed. Rep. of Germany ........ 74/474 |
| 1300405 | 7/1969 | Fed. Rep. of Germany ........ 74/142 |
| 817761 | 9/1937 | France .................... 474/80 |
| 1025012 | 4/1953 | France .................... 474/80 |
| 2306867 | 4/1976 | France . | |
| 2319525 | 7/1976 | France . | |
| 2337657 | 1/1977 | France . | |
| 2349489 | 4/1977 | France . | |
| 2395880 | 6/1978 | France . | |
| 605071 | 7/1948 | United Kingdom ............. 74/474 |
| 229145 | 7/1969 | U.S.S.R. .................. 74/143 |

*Primary Examiner*—Lawrence J. Staab
*Attorney, Agent, or Firm*—Larson and Taylor

[57] ABSTRACT

The invention relates to a selector device for the remote control of the position of a member 4 relative to a support 3 through a control means 8 acting at one end of a flexible traction coupling, particularly a cable 11, whose other end is connected, through connection means L, to said member 4. The connection means L comprise:
a piece p provided with notches c whose number is at least equal to the number of positions to be given to said member 4;
and means E, G, for moving the piece p, adapted to cooperate with the notches of this latter in response to the movements of the control means.

32 Claims, 43 Drawing Figures

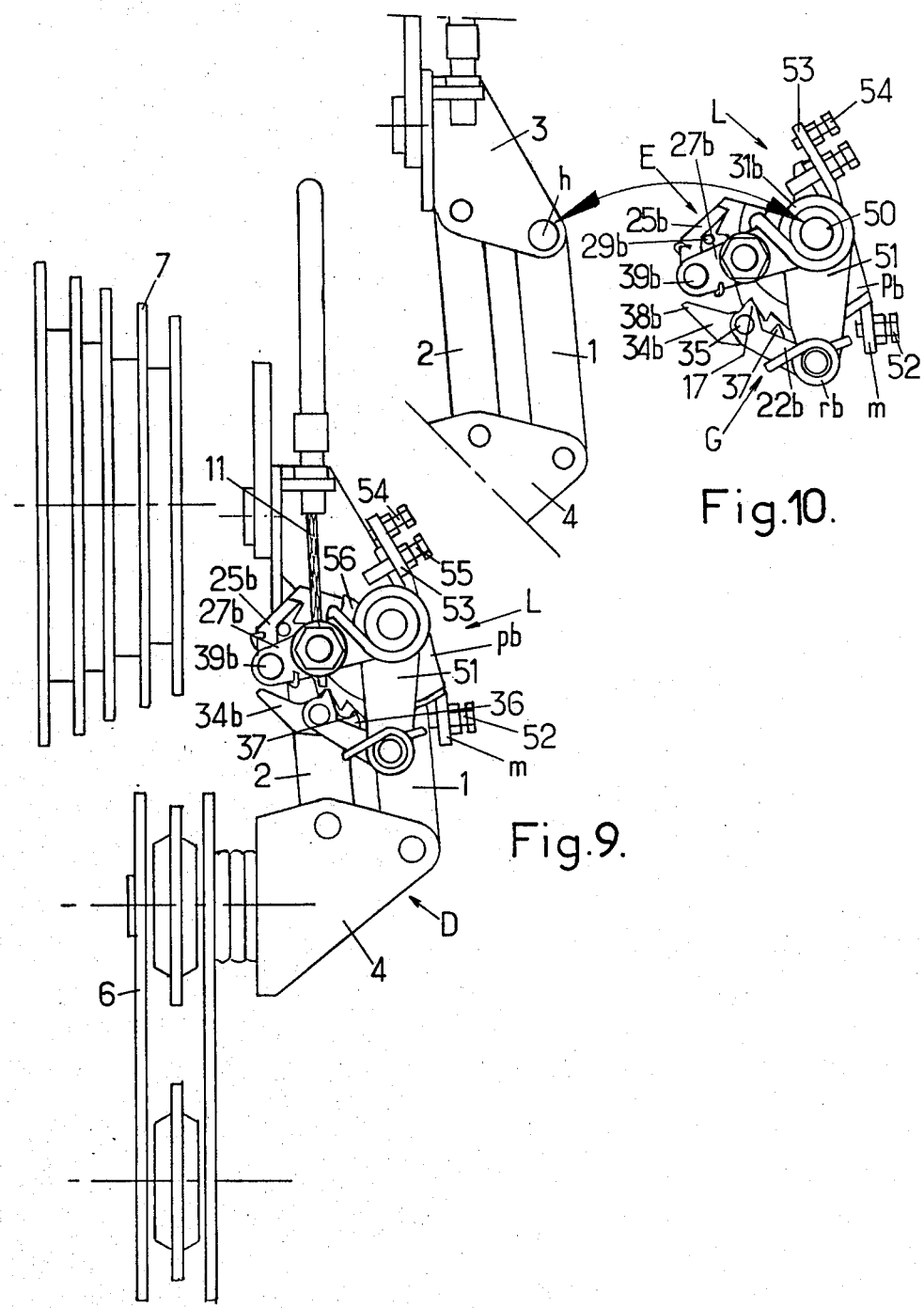

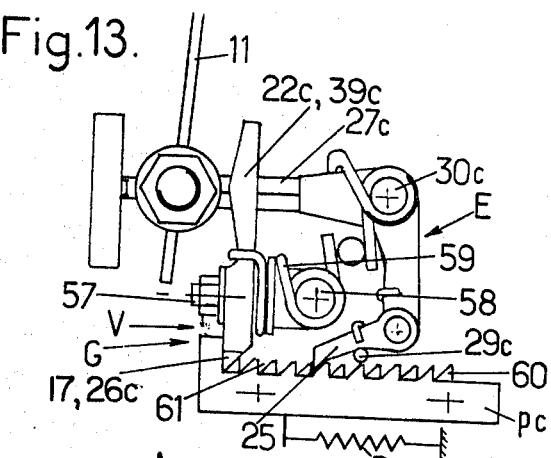
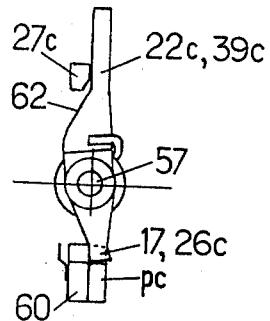
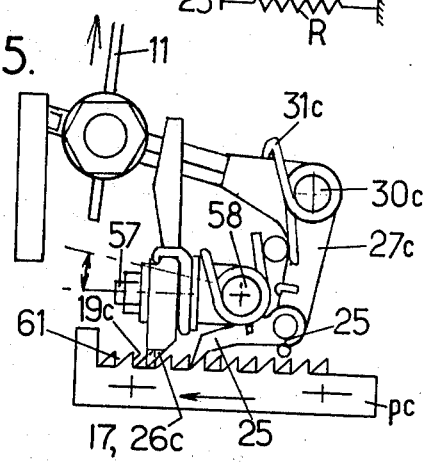
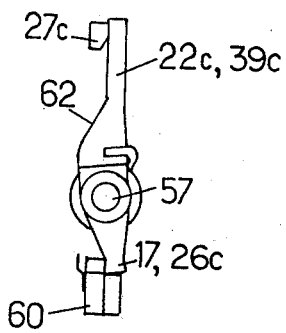
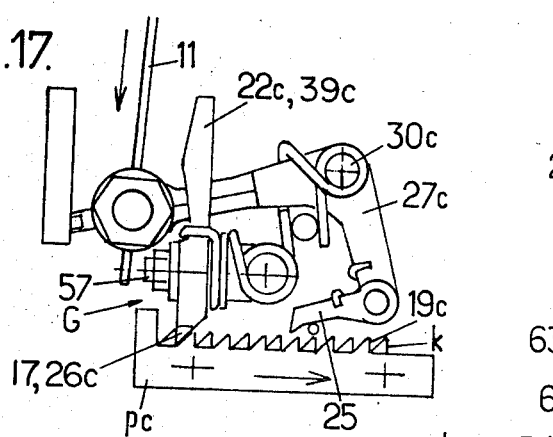
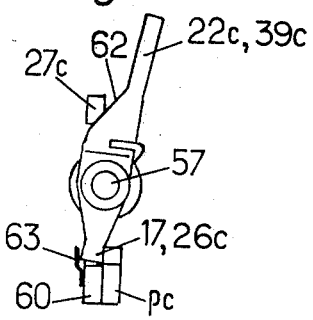
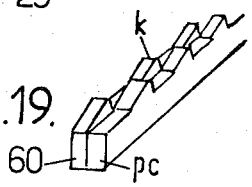

Fig. 24.
Fig. 25.
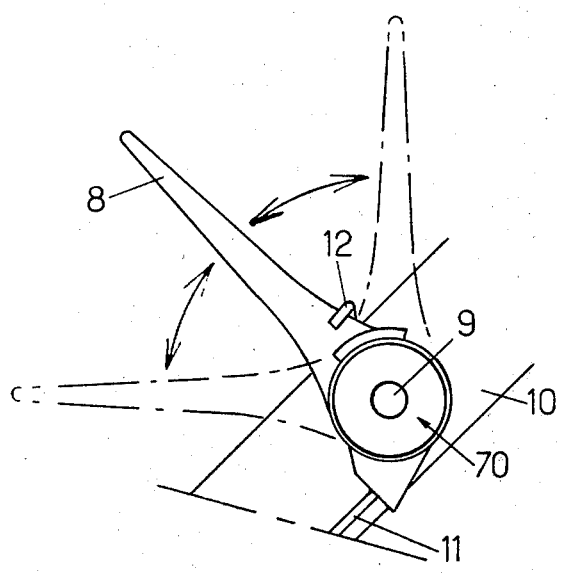
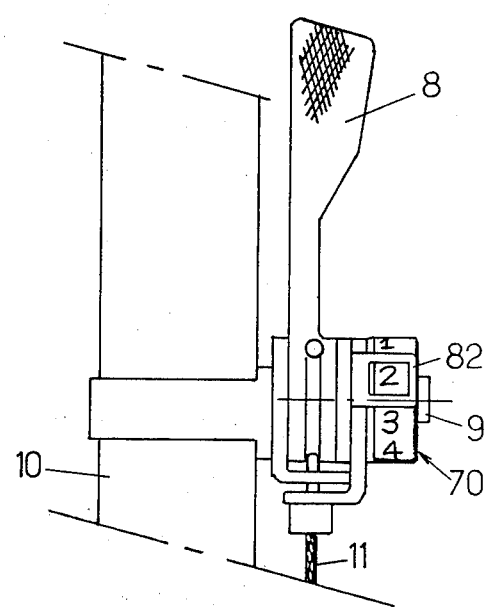

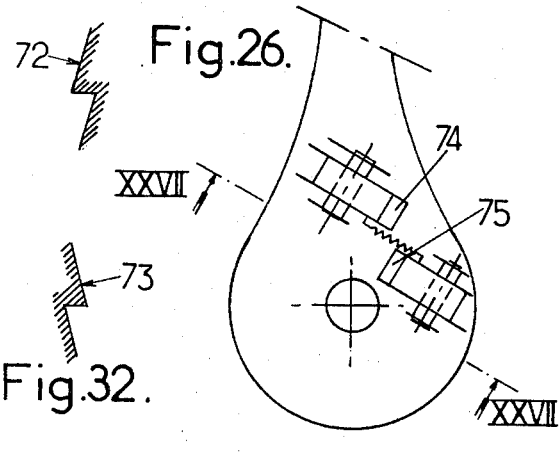
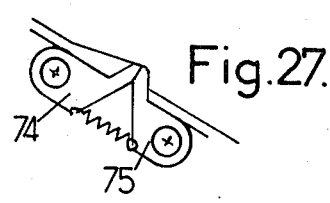
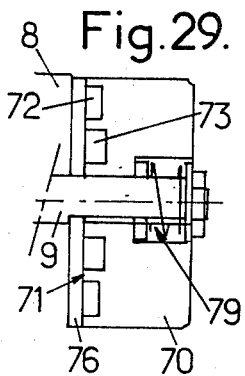
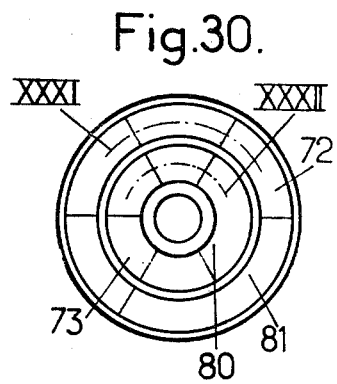
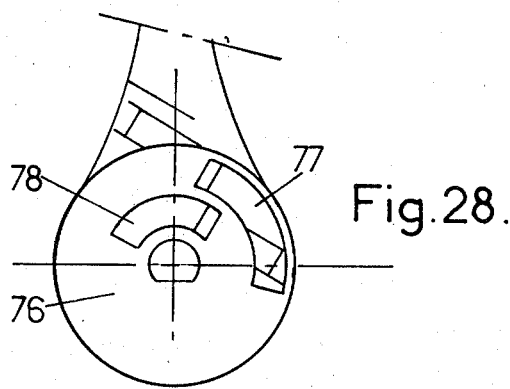

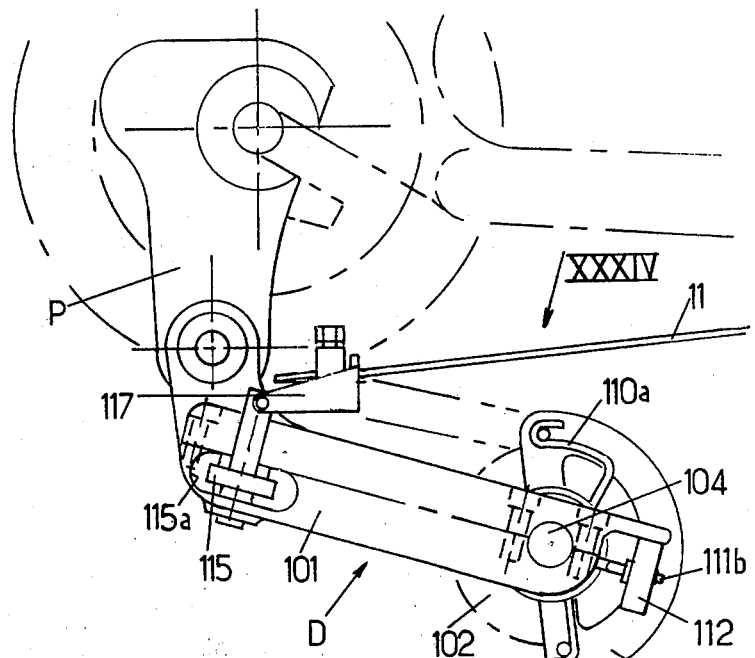
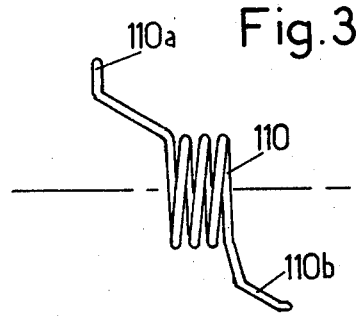
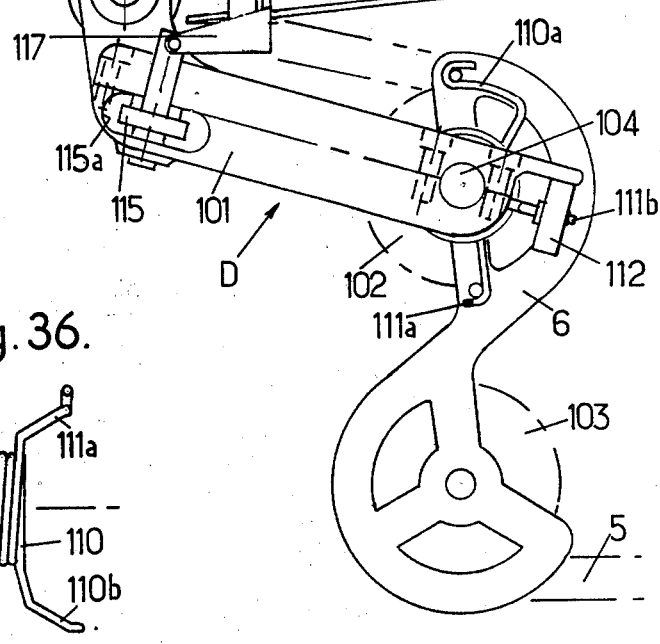
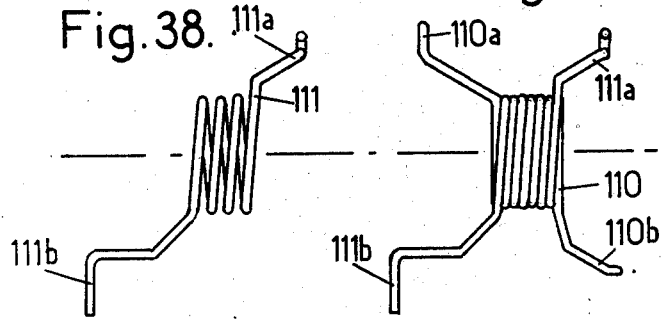

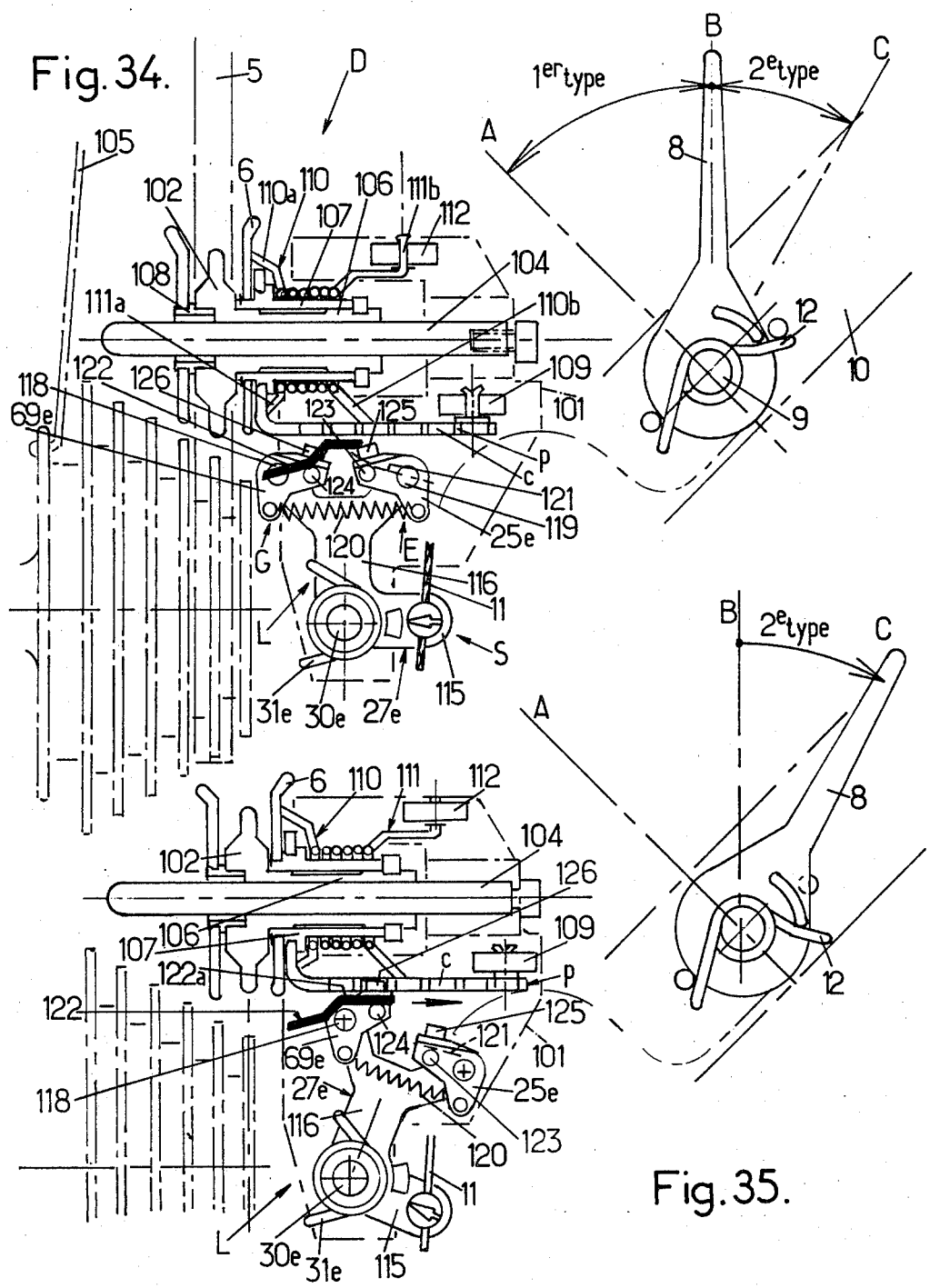

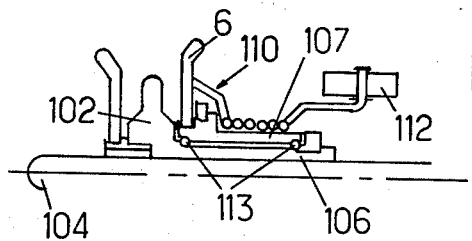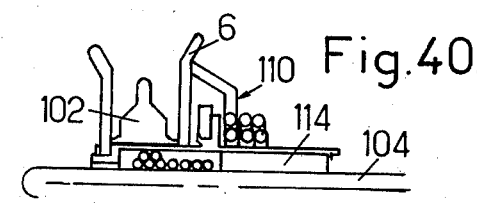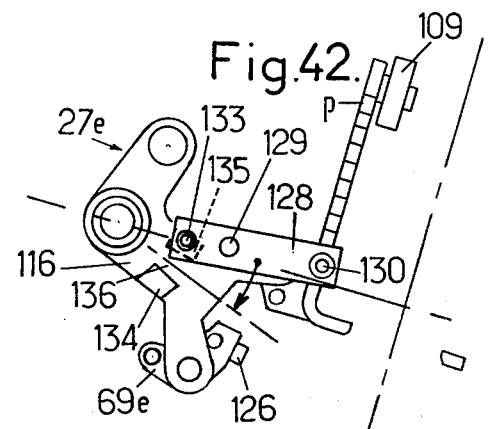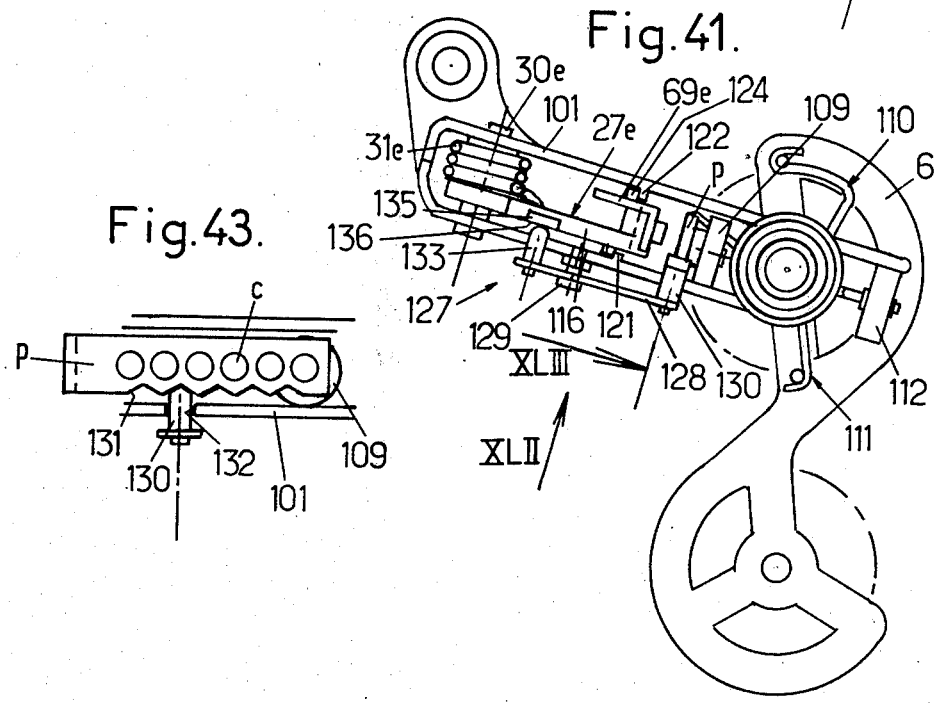

SELECTOR FOR A BICYCLE DERAILLEUR AND DERAILLEUR EQUIPPED WITH SUCH A DEVICE

BACKGROUND OF THE INVENTION

The invention relates to a selector device for the remote control of the position of a member relative to a support through a control means acting at one end of a flexible traction coupling, particularly a cable, whose other end is connected, through connection means, to said member.

The invention concerns more particularly, because it is in this case that its application seems to present the most interest, but not exclusively, such a selector device applied to the control of a bicycle derailleur.

The invention has as its aim, especially, to make this device such that it answers better than heretofore the different requirements of practice and particularly such that it provides an accurate control of the position of the member and this, despite the stretchability, however small this may be, of the flexible traction coupling, particularly the cable.

SUMMARY OF THE INVENTION

According to the invention, the selector device of the kind defined above is characterized by the fact that said connection means, between the member and the end of the flexible coupling, comprise:
- a piece provided with notches whose number is at least equal to the number of positions to be given to said member;
- and means to moving the piece adapted to cooperate with the notches of this latter in response to the movements of the control means, said piece being connected to one of the two elements formed by the member or the support, whereas the moving means are connected to the other of these two elements, the moving means being arranged so that in response to a movement of a first type of the control means they ensure a relative movement between the support and the member in a first direction, and that, in response to a movement of a second type of the control element, said moving means ensure a relative movement between the support and the member in a second direction opposite to the first.

Preferably the device is arranged so that the movement of the first type of the control means corresponds to a movement of said control means from a mean position to a first end position (first phase) with, normally, return to the mean position (second phase) whereas the movement of the second type corresponds to a movement of this control means from the mean position to a second end position (first phase) with, normally, return to the mean position (second phase).

The moving means comprise first ratchet means adapted to cooperate with said piece in response to a movement of the first type of the control means, these first ratchet means allowing a relative movement notch by notch between the support and the member.

The moving means comprise, generally, second ratchet means adapted to cooperate with the piece in response to a movement of the second type of the control element, these second ratchet means allowing a relative movement notch by notch between the support and the member in the second direction.

The device may comprise locking means, particularly with resilient return, provided for cooperating with a notch of the piece to maintain this latter in position.

Advantageously, the piece is connected to said member.

Said piece may be fixed, particularly with possibility of adjustment, directly on the member.

According to a first group of embodiments, resilient return means are provided to generate a return force between the piece and the support.

The locking means of the piece then form advantageously part of the second ratchet means.

These locking means comprise a bolt adapted to engage, under the action of the resilient means, in one of the notches of the piece, the form of these notches and the form of the bolt being selected so that the reaction generated by the return force on the piece at the level of the contact of one face of the bolt with a corresponding face of the notch does not tend to urge the bolt out of the notch, whereas for a movement of the piece relative to the support against this return force, the cooperation of the other face of the bolt with the other face of the notch causes the bolt to come out of the notch.

The first ratchet means are arranged to move the piece against the resilient return force.

The second ratchet means are arranged to free the bolt from the piece and let this piece move by only one notch under the action of the resilient return force.

The first ratchet means comprise a pawl adapted to abut against the bottom of a notch of the piece and to drive this piece during the first phase of the movement of the first type so as to cause the bolt to pass into the next notch.

This pawl is carried by the end of an arm pivoting about a pin carried by the support, the end of the flexible coupling being fastened to this arm and a resilient return force being exerted on said arm so as to maintain the flexible coupling under tension, the assembly being such that the movement of the first type corresponds to a movement of the control means which begins by a tractive force exerted on the flexible coupling (first phase) then by release of the flexible coupling (second phase) for the return of the control means to its mean position.

The second ratchet means are arranged so that, during the first phase of the movement of the second type, the bolt is freed from the face of the notch against which it was in abutment, so that the piece moves under the action of the resilient return force, these second ratchet means comprising abutment means adapted to retain the piece when it has traveled substantially half a notch, these second ratchet means ensuring, during the second phase of the movement of the second type, the return of the bolt to the following notch, the abutment means freeing the piece.

According to a first solution, the bolt may be freed from one notch of the piece by a movement in the mean plane of the bolt and the piece, and in a direction substantially perpendicular to the direction in which the notches follow one another.

The bolt may, in this case, be carried by a finger moving in a straight line, or by a finger pivoting, at one end, about a pin.

The second ratchet means comprise an arm, particularly cranked, pivoting about a pivot carried by the bolt, this arm comprising a head, particularly rounded, provided with a nose adapted to penetrate into a notch adjacent the one cooperating with the bolt, interaction means being provided between this arm and the first ratchet means so that the movements of the first ratchet means cause rotation of this arm, the assembly being such that, during the first phase of the movement of the second type, rotation of said arm about the pivot carried by the bolt and the cooperation of the head with the surface of a notch causes the bolt to come out, the nose of the head forming the abutment means adapted to retain the piece at the end of the first phase of this movement of the second type, whereas during the second phase of this movement of the second type, the arm assumes the position which allows the bolt to return into the next notch.

The interaction means between the arm and the first ratchet means may be formed by a connecting link, particularly when the piece provided with notches has a rectilinear mean line so as to form a rack.

When said member is connected to the support by at least one leg pivoting about a pin carried by the support, resilient return means being provided between said leg and the support, it is advantageous to form the piece, the first and second ratchet means and the locking means as an assembly adapted to be mounted on an extension of said pivoting pin of the leg.

The piece is then formed by a circular sector provided with notches, centered on said pin, and comprising a unilateral stop cooperating with said leg, the first ratchet means comprising a lever pivoting on said pin and connected to the flexible coupling, this lever being provided with said pawl, said ratchet means comprising also a lever pivoting on said pin and bearing against the support so as to be locked in relation to this support, this lever carrying at one end a resiliently biased pivotably mounted finger provided at one end of said bolt, said arm of the second ratchet means being pivotably mounted about a pivot carried by this bolt; the interaction means between the first ratchet means and the arm of the second ratchet means are then formed by unilateral abutment means, provided on the lever of the first ratchet means, and adapted to act against the arm of the second ratchet means so as to cause it to rotate. These interaction means may be formed by a peg caried by said lever.

According to a second solution, the bolt is pivotably mounted on a rod parallel to the direction in which the notches of the piece follow each other so that the bolt may be freed from a notch by rotation, about said rod, in a plane perpendicular to the direction in which the notches of the piece follow one another, this rotation being controlled by thrust means acting on the bolt, during the first phase of the movement of the second type, the abutment means adapted to retain the piece at the end of the first phase of this movement of the second type being formed by a second piece provided with notches, and staggered substantially by half a notch in relation to the first piece, the bolt coming back into a notch of the first piece during the second phase of the movement of the second type.

According to another embodiment, said piece may be subjected to no resilient return force in relation to the support.

The locking means are then separate from the second ratchet means, and these locking means as well as the notches of the piece are arranged so as to allow the piece to move, in one direction or in the opposite direction, in response to a sufficiently strong action exerted on said piece.

The locking means are formed preferably by a device of the ball testing type comprising a ball or a roller urged by resilient means to engage in a notch of the piece and to maintain this latter in position.

The device of the invention is suitable particularly for controlling the passage of a drive chain, from one sprocket to a sprocket of a different diameter, the first ratchet means controlling the movement of the piece provided with notches in the direction which corresponds to the chain passing from a lower sprocket to the immediately higher sprocket.

The first ratchet means are then arranged so that at the end of the first phase of the movement of the first type, the chain occupies a position beyond the normal position, corresponding particularly to about half a notch of the piece, the return of the chain to a position corresponding to that of the sprocket being obtained during the second phase of the movement of the first type.

A particularly advantageous application of a selector device such as defined above, concerns bicycle derailleurs, not only the rear derailleur (controlling the change of the sprockets of the rear wheel) but also the front derailleur (controlling the change of chain wheel).

The control means is then formed by the usual control lever of the derailleur and said member is formed by a guide for the chain of the bicycle.

In the case where it is the matter of a derailleur control for the rear sprockets of the bicycle, this selector device is arranged so that the passing from a smaller diameter sprocket to a larger diameter sprocket is controlled by the first ratchet means and this, so that, at the end of the first phase of the movement of the first type, the member, that is to say the guide of the chain, occupies a position beyond the normal position; the return of the guide of the chain to a position corresponding to that of the sprocket is obtained during the second phase of the movement of the first type.

This fleeting overshooting of the desired position facilitates the passage of the chain onto the higher pinion.

Stop means are provided at the level of the ratchet means so as to provide an accurate limit to the momentaneous overshooting of the position of the guide of the chain at the end of the first phase of the movement of the first type.

The selector device comprises advantageously at the level of the control means, means for displaying the position of said member.

According to an advantageous solution in the case of a bicycle derailleur, the chain guide is slidably mounted about a transverse shaft, and the means for moving the piece are arranged so as to move away from this piece and to release it completely when a sprocket change is completed.

Preferably, the transverse shaft is the pivoting shaft of the chain guide; it may be coaxial with the upper roller of the chain guide.

According to a first possibility, the slidable mounting of the chain guide with reduced sliding friction, is provided by a sleeve, integral with the rotary roller, the unit formed by the sleeve and the roller being rotatable and slidable in relation to the transverse shaft, the chain guide moving with the roller in its movement of translation, the resilient return means exerting the return torque which maintains the tension of the chain being arranged so as to produce no substantial parasitic transverse reaction to the sliding; the combination of rotation of the roller and the sleeve and the absence of a substantial transverse reaction allows the chain guide assembly to slide with reduced friction.

The resilient return means with zero or substantially zero transverse reaction may be formed by two springs with return torque in the same direction, but with an opposite transverse or radial effect.

According to a second possibility, the chain guide is slidably mounted on the transverse shaft by means of a ball socket, for axial movements, which provides reduced friction sliding.

The means for moving the piece provided with notches comprises preferably first and second ratchet means adapted to come into play respectively, in response to the movements of the first and of the second types of the control lever, these first and second ratchet means comprising a common pivotably mounted arm, provided with two pawls for working in opposite directions and connected by interaction means, formed particularly by a spring, the end of the control cable being attached to said arm.

The piece provided with notches extends parallel to the transverse pivoting shaft of the chain guide in the vicinity of the pawls. The notches of this piece may be formed by holes in which the ends of the pawls formed by pegs are adapted to engage during a movement.

The device comprises preferably, for each pawl, a cam provided with a ramp cooperating with a stud integral with the pawl and defining the angular position of this pawl under the effect of a resilient return force, the assembly being such that during rotation of the arm carrying the pawl, in a specific direction, the ramp of the cam guides the pawl until its stud penetrates into the corresponding notch of the piece to drive this latter.

Two cams are generally provided respectively for the two pawls, these two cams being situated in different planes respectively above and below the arm carrying the pawls.

Means for locking the piece and the chain guide in a position corresponding to that of a sprocket may be provided.

The above and other objects, features and advantages of the present invention will become apparent from the following description, given solely by way of non-limiting illustration, when taken in conjunction with the accompanying drawings.

DESCRIPTION OF THE DRAWINGS

FIG. 9 illustrates another embodiment of the selector device, adaptable to a parallelogram bicycle derailleur.

FIG. 10 illustrates the mounting of the selector device of FIG. 9 on the derailleur.

FIG. 13 illustrates another embodiment of the selector device of the invention.

FIG. 14 is a partial view from the left in relation to FIG. 13.

FIG. 15 shows the device of FIG. 13 in an operational phase.

FIG. 16 is a view from the left in relation to FIG. 15.

FIG. 17 shows the device of FIG. 13 in another operational phase.

FIG. 18 is a view from the left in relation to FIG. 17.

FIG. 19 is a partial perspective view of the piece provided with notches to which is joined side by side another piece serving as stop means at the end of the first phase of the movement of the second type.

FIG. 24 shows the control means formed by a bicycle derailleur control lever, equipped with means for displaying the position of the member.

FIG. 25 is a view from the left in relation to FIG. 24.

FIG. 26 is a view of the base of the lever of FIG. 24, provided with pawls.

FIG. 27 is a partial view along XXVII—XXVII of FIG. 26.

FIG. 28 is a view of the disk provided with windows, for selective action of the pawls of the lever.

FIG. 29 is a sectional view of the display drum, comprising sets of teeth adapted to cooperate with the pawls.

FIG. 30 is a view from the left of the drum of FIG. 29 showing the two sets of teeth adapted to cooperate with the two pawls.

FIG. 31 is a partial section along line XXXI of the outer track of FIG. 30.

FIG. 32 is a partial section along line XXXII of the inner track of FIG. 30.

FIG. 33 is a general elevational view of another embodiment.

FIG. 34 is a simplified view along arrow XXXIV of FIG. 1.

FIG. 35 is a view similar to that of FIG. 34 but for a different operational position.

FIG. 36 shows the resilient return means for rotation of the chain guide.

FIGS. 37 and 38 show the two springs comprising the resilient means of FIG. 36.

FIG. 39 illustrates a variation for mounting on the transverse shaft.

FIG. 40 illustrates the mounting of the chain guide on the transverse shaft with a ball socket.

FIG. 41 is an elevational view with parts cut away of a device according to the invention comprising means for locking the chain guide.

FIG. 42 is a partial view along arrow XLII of FIG. 41.

FIG. 43 finally is a partial view along arrow XLIII of FIG. 41.

DESCRIPTION OF THE PREFERRED EMBODIMENTS

With a view to simplification, the description will concern essentially the application of the selector device of the invention to a bicycle derailleur gear change and more precisely to derailleurs for rear sprockets. It is clear however, that the selector device of the invention may be suitable for the front derailleur of a bicycle equipped with several front chain wheels, the front derailleur controlling the passage of the chain from one chain wheel to the other. It is also clear that this selector device may be suitable for controlling, in a general way, the position of a member relative to a support.

Referring to FIGS. 1 to 5, there can be seen one embodiment of the selector device S of the invention.

Figure 1:
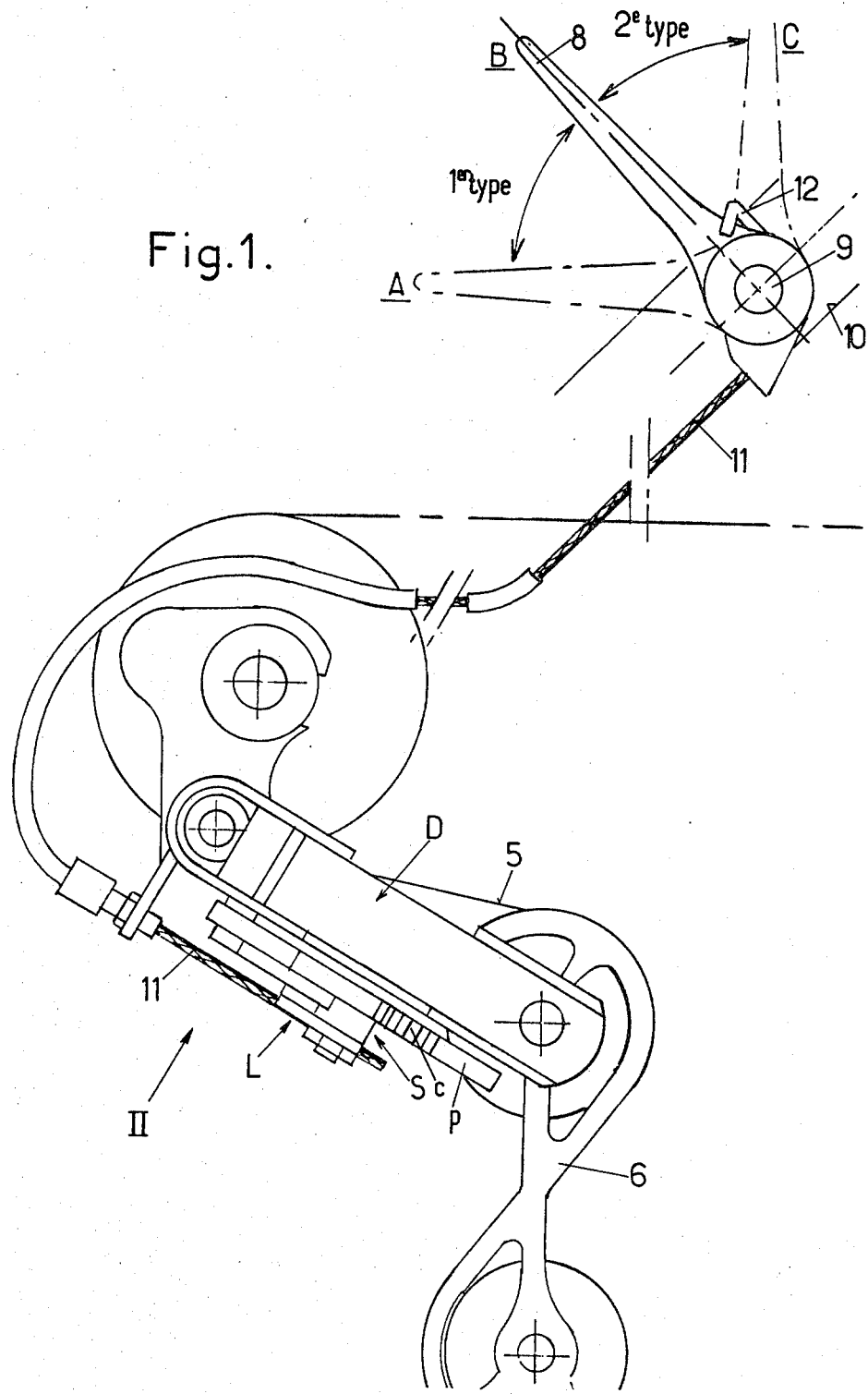
FIG. 1 of these drawings is a simplified view of a bicycle derailleur equipped with a selector device in accordance with the invention.

As can be seen in FIG. 1, this selector device S has been mounted under a conventional derailleur D for bicycle rear sprockets. It is a question, more particularly, of a deformable parallelogram derailleur comprising two parallel branches 1, 2 hinged to a support 3 and supporting a member 4 which is movable in relation to support 3 through deformation of the parallelogram. Member 4 supports the guide 6 of the bicycle chain 5; this guide is fitted with a conventional roller device for holding the chain 5 under tension despite the variation of the diameter of the rear sprockets such as 7, when changing sprocket. These rear sprockets 7 have been shown as five in number in FIGS. 2 to 5. The movement of member 4 in a direction parallel to the axis of the sprockets allows chain 5 to be passed from one pinion to the other.

The control of the position of member 4 is effected, remotely, by a control means formed by a conventional lever 8 (FIG. 1) articulated to a pin 9 mounted on the frame 10 of the bicycle. Lever 8 acts on the end of a traction cable 11. The other end of this cable 11 is connected by connecting means L to member 4.

A torsion spring 12 is provided for maintaining lever 8 in the mean position B shown by a continuous line in FIG. 1.

From this position, lever 8 may describe a movement of a first type which will be discussed further on. This movement of a first type comprises a first phase in which, according to the embodiment of FIG. 1, lever 8 rotates about its pin 9 in an anticlockwise direction to the position shown by a dash-dot line A in this FIG. 1, which results in exerting a traction on cable 11; in a second phase of this movement of the first type, lever 8 returns, by rotating in a clockwise direction, from its end position A to mean position B.

In a movement of the second type, lever 8 moves, first of all, clockwise from its mean position B to the end position C shown by a dash-dot line in FIG. 1, which corresponds to a slackening of cable 11; lever 8 then comes back in an anticlockwise direction to its mean position.

Connecting means L comprise a piece p provided with notches c whose number is at least equal to the number of positions to be given to member 4.

In the example described, five positions are to be given to member 4, these positions corresponding to the five sprockets 7. Piece p comprises six notches, i.e. one notch more than the number of positions to be given to member 4. This additional notch avoids an overlapping of the different components of the selector device.

Figure 2:
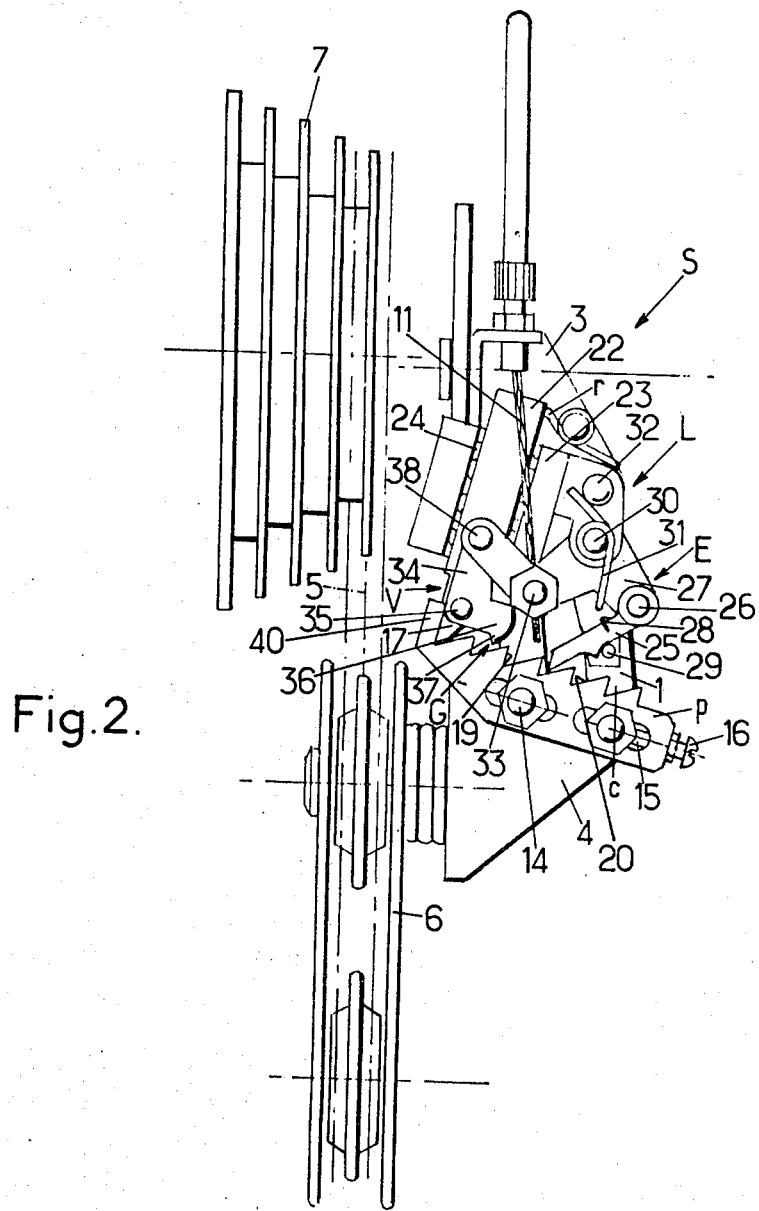
FIG. 2 is a view of the selector device along arrow II of FIG. 1.

Piece p is fixed directly to member 4, with possibility of adjustment, as can be seen in FIG. 2. Fixing is provided by means of studs 14, integral with member 4, which pass through buttonholes 15 provided in piece p; this latter is locked to member 4 by means of nuts screwed onto the studs 14. A screw 16 engaged in piece p bearing on member 4 allows an accurate adjustment of the relative position of piece p.

As can be seen in FIGS. 2 to 5, piece p has a rectilinear mean line and forms, as it were, a rack.

Resilient return means (not shown in the drawings) are provided for generating a return force between piece p and support 3.

In fact, in the present case of a rear bicycle derailleur, these resilient return means are formed by the convention torsion spring which ensures the return of member 4 in relation to support 3.

Connecting means L comprise, also:
first ratchet means E adapted to cooperate with piece p in response to a movement of the first type of the control lever 8;
second ratchet means G adapted to cooperate with piece p in response to a movement of the second type of control element 8;
and resilient return r locking means V provided for cooperating with a notch of piece p so as to maintain this latter in position.

Figure 3:
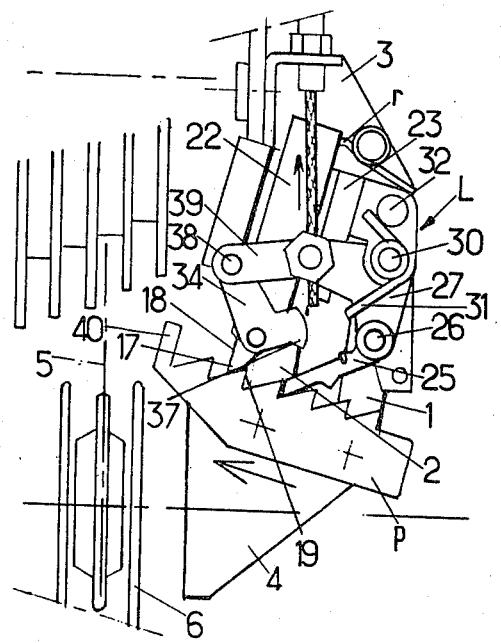
FIGS. 3, 4 and 5 show, similarly to FIG. 2, the elements of the selector device in positions corresponding to operating phases.
Figure 4:
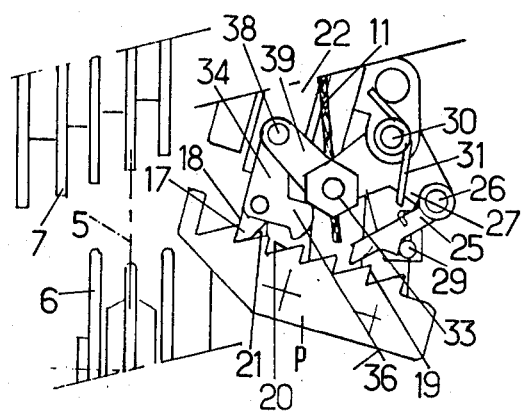
Figure 5:
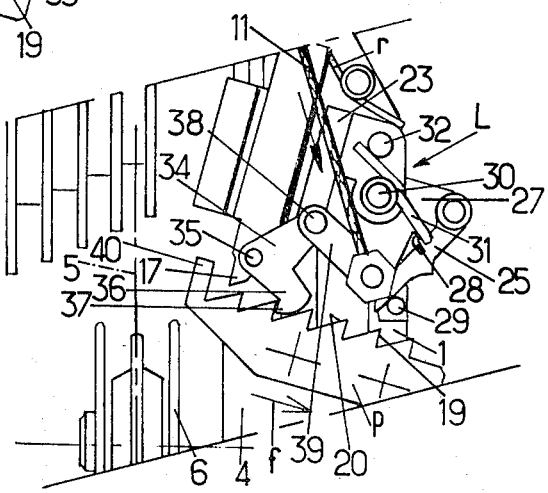

The resilient return force exerted between piece p and support 3 tends to move piece p from left to right as shown in FIGS. 2 to 5, i.e. in the direction of arrow f (FIG. 5).

Locking means V comprise a bolt 17 formed by a sort of tooth which engages in a notch c of piece p; the form of bolt 17 and of notches c is chosen so that the reaction generated by the return force on piece p at the contact level of one face of the bolt, with a corresponding face of the notch, does not tend to urge the bolt out of the notch. For that, face 18 in question (FIGS. 3 and 4) of the bolt and the faces such as 19 of notches c intended to cooperate with this face 18 are substantially orthogonal to the mean direction of movement of piece p.

The other face 20 of each notch c and the other face 21 (FIG. 4) of the bolt are inclined so that a movement of piece p, against the return force, i.e. from right to left in FIGS. 2 to 5, causes bolt 17 to come out of notch c and, possibly, to pass into the next notch.

Bolt 17 is supported by a finger 22 moving in a straight line and capable of sliding, in a direction perpendicular to the mean direction of piece p, in a sleeve 23 integral with support 3. The sliding of finger 22 may be facilitated by placing balls 24 (FIG. 2) between the outer surface of this finger and the inner surface of the sleeve.

The first ratchet means E comprise a pawl 25 pivoting about a pin 26 carried at the end of a cranked arm 27. Pawl 25 is urged resiliently in rotation, in an anticlockwise direction, by a spring 28, relative to arm 27. A peg 29 integral with an extension of support 3, is provided for forming a stop limiting the rotation of pawl 25.

Arm 27 is pivotably mounted, at the end of its bend, about a fixed pin 30 carried by support 3. Arm 27 is resiliently urged by a torsion spring 31, surrounding pin 30 and bearing on a lug 32 of support 3; under the action of this spring 31, arm 27 tends to rotate in an anticlockwise direction about pin 30.

Cranked arm 27 is connected at its other end distant from pin 26 to the end of the flexible link 11; this connection may be provided by a conventional device 33 for clamping the cable by means of nut and screw or by means of an intermediate link arm.

When arm 27 rotates in a clockwise direction about pin 30, pawl 25 is adapted to abut against the bottom of a notch c of piece p and to drive this piece, from right to left looking at FIGS. 2 to 5, i.e. against the return force exerted on piece p.

The dimensions of arm 27 and pawl 25 are determined so that at the end of this rotation of arm 27 in a clockwise direction (which corresponds to the end of the first phase of movement of the first type of lever 8) piece p and member 4 have cleared by about half a notch the next position, as shown in FIG. 3, which, as explained further on, facilitates the passage of the chain from a lower sprocket to an upper sprocket. When lever 8, during the second phase of the movement of the first type, comes back to its mean position, arm 27 rotates in an anticlockwise direction about pin 30, which allows piece p to assume its exact position under the action of the return force, bolt 17 then coming down into the bottom of notch c.

The second ratchet means G are arranged to free bolt 17 a notch c and to let piece p move one notch only, under the action of the resilient return force, during a movement of the second type of lever 8.

Locking means V form part of the second ratchet means G, shown in FIGS. 2 to 5.

The second ratchet means G comprise an arm 34, substantially in the form of a right-angled bend, pivoting, near its top, on a pivot 35 integral with bolt 17. In the rest position, part of this arm 34 extends substantially parallel to piece p; this part comprises at its end a rounded head 36, provided with a nose 37 adapted to penetrate in a notch c adjacent the one which cooperates with bolt 17.

The other part of cranked arm 34, in its mean position shown in FIG. 2, substantially parallel to the direction of finger 22. The end of this other part of arm 34 carries a lug 38 on which is pivotably mounted a link arm 39 connecting with an end of arm 27 of the first ratchet means. This link arm is also pivotably mounted on the end of this arm 27. This connecting link arm 39 constitutes the interaction means between the first ratchet means E and arm 34; these interaction means control the rotation of arm 34, about 35, particularly during a movement of the second type of lever 8. The rotation of arm 34, during the first phase of the movement of the second type of lever 8 is effected in a clockwise direction about pivot 35 and the cooperation between head 36 and the inclined face 21 of a notch c causes bolt 17 to come out of notch c (FIG. 5); nose 37 stops piece p and constitutes the stop means adapted to retain this member at the end of the first phase of movement of the second type.

During the second phase of this movement of the second type the cranked arm assumes a position which allows bolt 17 to return into the next notch c.

The end, situated at the left in FIGS. 2 to 5, of piece p comprises an abutment wall 40 whose height is greater than that of notches c and is sufficient to prevent bolt 17 from escaping when this latter is in contact with wall 40 (FIG. 2) and when, by inadvertence, lever 8 is operated following a movement of the second type which, normally, moves piece p to the right.

It is clear that the spacing between the successive notches c of piece p is established to correspond with the spacing existing between the successive sprockets 7.

This being so, the operation of the selector device of the embodiment of FIGS. 1 to 5 is the following.

The starting position considered will be that of FIG. 2 in which chain 5 is round the smallest sprocket 7, bolt 17 being engaged in the leftmost notch of piece p, face 18 of this bolt being in contact with wall 40.

To cause chain 5 to pass onto the sprocket of a larger diameter, immediately adjacent the smallest sprocket, i.e. to move piece p one notch from right to left, lever 8 is actuated to communicate thereto a movement of the first type (FIG. 1) i.e. in the first phase of the movement, a traction is exerted on cable 11 and in the second phase of the movement, this cable 11 is released to return to the mean position.

The traction exerted on cable 11 causes a rotation of arm 27 in a clockwise direction about fixed pin 30 and pawl 25 to come into the bottom of a notch c. The pawl pushes piece p from right to left. Bolt 17 slides against the inclined face 21 of notch c in which it is engaged, which causes this bolt 17 and rod 22 to rise. The traction on cable 11 caused, moreover, the rotation of arm 34 about pivot 35 in an anticlockwise direction, which causes head 36 to come completely out of notch c and frees the passage for the movement of piece p from right to left. As soon as the movement controlled by pawl 25 corresponds to the amplitude of a notch c, bolt 17 clears the top separating the two adjacent notches and, pushed back by resilient means r, this bolt 17 plunges into the bottom of the notch situated immediately to the right in relation to that in which it was.

However, the first phase of the movement of the first type, corresponding to the traction of cable 11 is not completely finished; pawl 25 continues then to move piece p leftwards, which again causes bolt 17 to rise in the new notch in which it is engaged.

At the end of this first traction phase, the elements of the device occupy the positions shown in FIG. 3; it can be seen that bolt 17 is bearing about halfway along the inclined face 21 of the adjacent notch, in relation to FIG. 2.

Thus, the position of member 4 corresponding to the sprocket immediately adjacent the lower sprocket has been exceeded by about half a notch, which facilitates the passage of the chain from a smaller diameter sprocket to a larger diameter sprocket.

During the second phase of the movement of the first type, cable 11 is released; arm 27 rotates in an anticlockwise direction about pin 30 and frees pawl 25; bolt 17 under the resilient return force penetrates into the bottom of the notch and gives to piece p and member 4 the exact position corresponding to that of the immediately higher sprocket. The position of the different elements of the selector device at the end of this first type movement is shown in FIG. 4.

It is to be noted that there may be provided at the level of the selector device, for example on arm 27, a stop which, at the end of travel of the movement of the first type, abuts against support 3 so as to limit the amplitude of the rotation of arm 27 irrespective of the amplitude of the movement of lever 8.

It will be readily understood that the passage of the chain onto the higher sprocket, immediately following, is obtained by actuating lever 8 with a new movement of the first type.

Thus, at each movement of the first type, the chain may be caused to pass from a lower sprocket to the immediately higher sprocket, without having to bother about the accuracy of the amplitude of the movement communicated to lever 8, nor with the accuracy of the mean and end positions of this lever.

The passage of the chain from a higher sprocket to an immediately lower sprocket is obtained by actuating lever 8 with a movement of the second type.

The starting position considered will be that of FIG. 4 in which the chain is on the sprocket immediately higher than the smallest sprocket.

By actuating lever 8 with the movement of the second type, a slackening of cable 11 is caused in the first phase of the movement as shown in FIG. 5. Arm 27 rotates then in an anticlockwise direction about pin 30. Link arm 39 drives lug 38 and arm 34 in rotation, in a clockwise direction, about pin 35 carried by bolt 17. Head 36 penetrates into a notch and bears against the inclined face 20 of this notch. The cooperation of head 36 and this inclined face generates, in reaction to the traction force exerted by link arm 39 on lug 38, a force on pivot 35 which causes bolt 17 to rise and to be completely released in relation to face 19 of the notch in which it was engaged.

With piece p being thus freed, it moves, under the action of the resilient return force exerted between this piece and support 3, from left to right. Head 36 slides against the inclined face 21 of the notch and penetrates further into this notch. The movement of piece p to the right is possible until nose 37 cooperates with face 19 of a notch to stop the travel of piece p.

The dimensions of the different elements are adjusted so that in this intermediate position (FIG. 5) which corresponds to the end of the first phase of the movement of the second type, the tip of bolt 17 has cleared the tip separating the notch in which the bolt was previously engaged from the notch located immediately on the left. The tip of bolt 17 is then at right angles to the inclined face of the adjacent notch.

During the second phase of the movement of the second type, the return to the mean position of the lever causes a traction on cable 11; arm 27 of the first ratchet means will turn, in a clockwise direction, about pin 30 to take up the position of FIG. 2. Arm 34 of the second ratchet means G rotates in a clockwise direction about pivot 35 so that nose 37 is disengaged from the top of the notch and allows a new movement of piece p to the right. Simultaneously, bolt 17 comes down into the next notch and holds piece p in the position of FIG. 2 which corresponds to a movement one notch to the right, in relation to FIG. 4.

So it appears clearly that each time the control lever 8 is actuated with a movement of the second type, the chain passes from one sprocket to the immediately lower sprocket, i.e. the movement of piece p by a single notch from left to right.

It should be noted in referring to FIG. 1, that during the first phase of the movement of the first type of lever 8, i.e. during the passage from mean position B shown with a continuous line to end position A shown with a dash-dot line, a traction is exerted on cable 11 to overcome the resistance of the conventional resilient return means of derailleur D; in the second phase of this movement of the first type, the return of lever 8 to its mean position is helped by these return means of the derailleur.

The mean position is determined by the stop of lever 8 at the end of the torsion spring 12.

During the first phase of the movement of the second type (lever 8 moved from its mean position to position C), the resistance of the torsion spring 12 must be overcome, the resilient return means of derailleur D helping this movement; however, the force of the resilient return means of derailleur D is less than that of spring 12.

For the second phase of the movement of the second type, spring 12 helps the return of lever 8 to the mean position.

The embodiment of FIGS. 1 to 5 concerned a selector device arranged to be adapted to a conventional derailleur, of the parallelogram type, as well as the derailleur equipped with the selector device of the invention.

Figure 6:
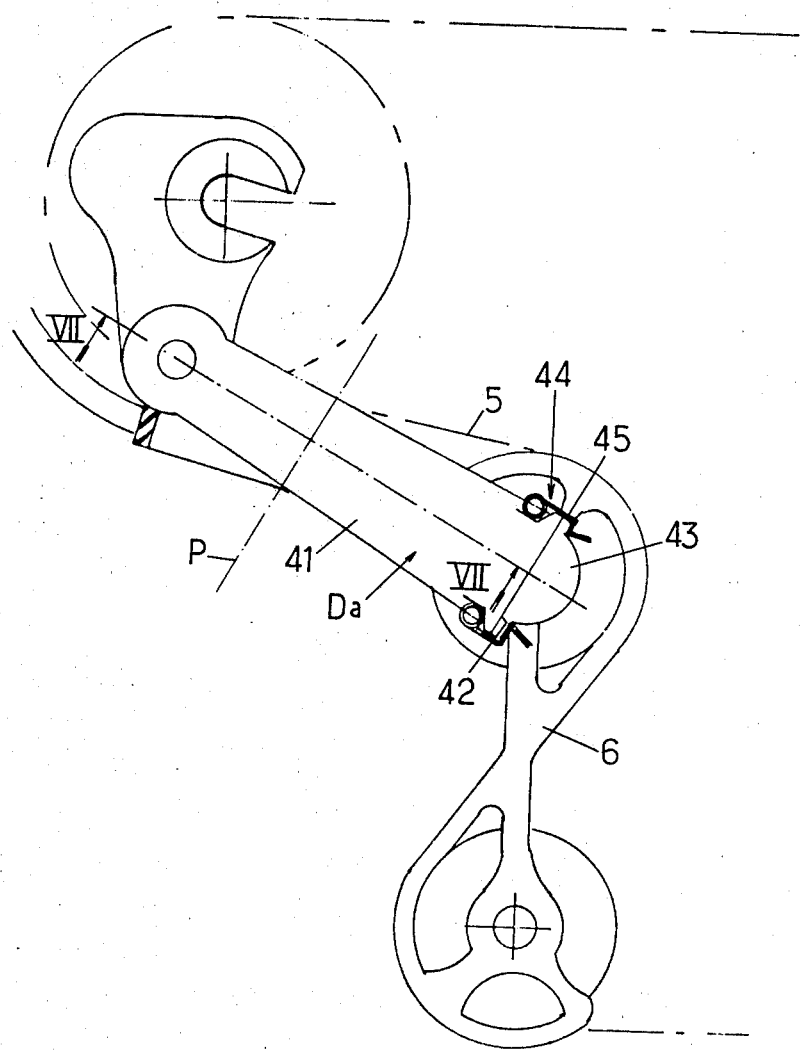
FIG. 6 is an elevational view of a bicycle derailleur specially arranged to receive a selector device of the invention.
Figure 7:
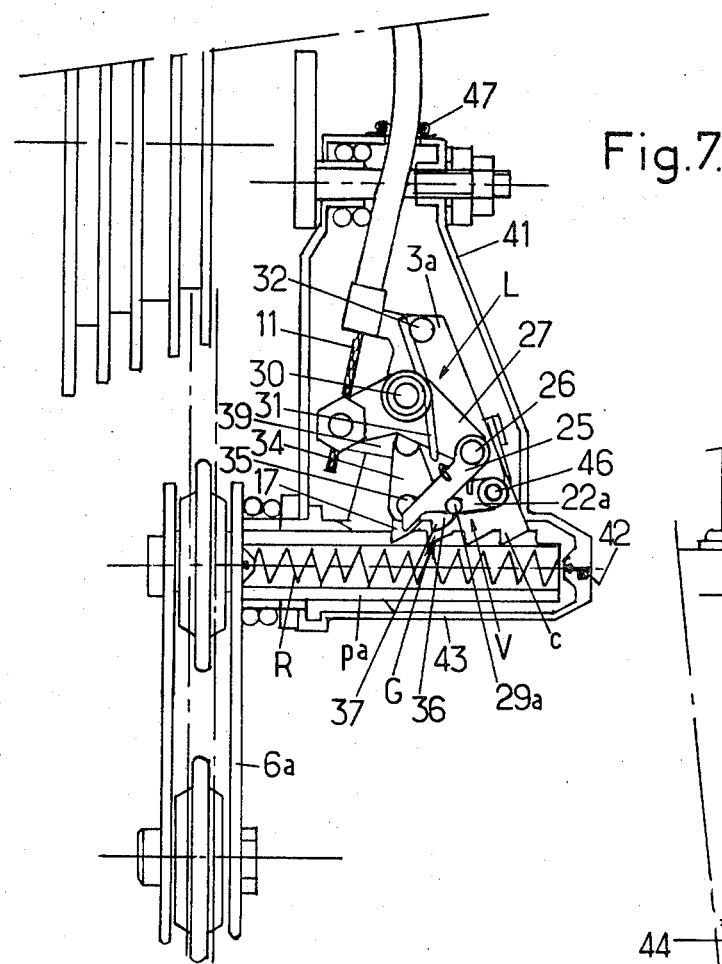
FIG. 7 is a sectional view along line VII—VII of FIG. 6.
Figure 8:
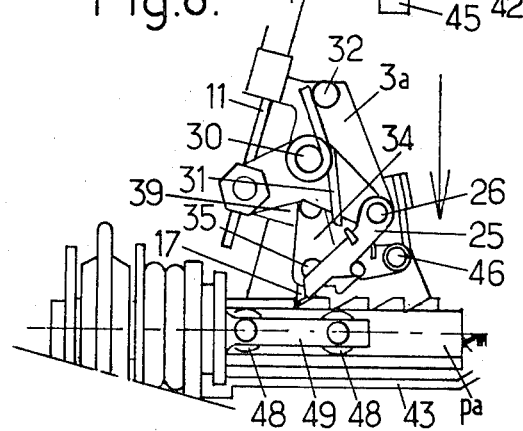
FIG. 8 is a partial exploded view, from the outside, of the casing of the derailleur of FIG. 6, the bottom of the casing being shown dismantled.

Referring to FIGS. 6 to 8, there can be seen a bicycle derailleur, for rear sprockets, specially designed with respect to a control by means of the selector device of the invention.

The elements of this derailleur and of the selector device identical or playing similar roles to elements already described in connection with FIGS. 1 to 5 are designated by the same references (letters or figures), possibly followed by the letter a; the description of these elements and their operation will not be considered again in detail, since it is similar to that given in connection with FIGS. 1 to 5.

Derailleur Da comprises a casing 41 whose shape can be seen on FIGS. 6 to 8; this casing has a hollow structure whose sections through planes parallel to the trace plane P (FIG. 6) have a closed contour. This casing presents then a maximum inertia for a minimum weight.

The lower end 42 of casing 41 is open. A bottom 43, for example in the form of a half-shell, is provided for closing this end 42, the fixing of this bottom to end 42 is provided by a rapid dismounting device 44, for example of the clip type and comprising hooks 45, pivoting on casing 41, adapted to clamp one against the other bottom 43 and end 42 flanges (FIG. 6).

The whole of the selector device is supported by bottom 43 so that the dismounting of this bottom allows the whole of the mechanism to be withdrawn as shown, in an exploded view, in FIG. 8. Support 3a is formed by a wall integral with bottom 43.

Piece pa, provided with notches, is formed by a tubular rack cylindrical in section; the resilient return means exerting a return force between this piece pa and support 3a are formed by a helical spring R housed inside piece pa and fastened at one end (situated on the right in FIG. 7) to bottom 43 and so to support 3a integral with this bottom; the other end of spring R is fastened to guide 6a integral in translation with rack pa.

Bolt 17, instead of being carried by a sliding finger, as in the case of FIGS. 2 to 5, is carried by a finger 22 pivotably mounted at its end remote from bolt 17, about a pin 46 carried by support 3a. The position of this pin is such that bolt 17 is braced in a notch c to maintain rack pa in position against the action of spring R.

Cable 11 and its sheath penetrate into casing 41, through the upper end which may possibly be provided with a joint 47.

It will be noted that the arrangement of the elements of the selector device in the embodiment of FIGS. 6 to 9 is more compact, link arm 39 and arm 34 of the second ratchet means being situated on the same side of cable 11 as arm 27.

The guiding of the movement of translation of guide 6a may be provided by rollers 48 (FIG. 8) supported by legs 49, integral in translation with guide 6a, and provided on each side of rack pa. These rollers 48 travel in guide grooves provided in bottom 43 and, possibly, in casing 41.

The operation of the derailleur of FIGS. 6 to 8 is identical with that described with reference to FIGS. 2 to 5; it will simply be noted that bolt 17 describes an arc of a circle about axis 46.

It may be noted, whatever the embodiment of the device of the selector, that it may be suitable for any number of speeds since the amplitude of the movement of piece p, pa is not limited by the amplitude of the movements of control lever 8.

FIGS. 9 to 12 concern an embodiment in which connection means L, i.e. the piece provided with notches, the first and second ratchet means and the locking means, are constructed in the form of an assembly adapted to be mounted on a pivot pin. This embodiment is intended for controlling a member 4 which is connected to support 3 by at least one leg 1 pivotably mounted about a pin h carried by support 3. The example shown is that of a conventional parallelogram derailleur D, for rear bicycle sprockets, similar to that shown in FIGS. 1 to 5.

The elements of the selector device and the connection means L similar or playing similar roles to elements already described with reference to the preceding figures are shown by the same references (letters or figures) possibly followed by the letter b. The description of these elements and their operation will not be taken up again in detail.

It should however be noted that piece pb is formed by a circular sector, provided with notches, centered on pin h; for that, the sector pb comprises a hole 50 for end-mounting of pin h which projects with respect to support 3. Piece pb comprises a unilateral stop m formed by a lug extending radially beyond the contour of the sector and provided with adjustable stop screw 52 intended to abut against the outer face of leg 1, as shown in FIG. 9.

The first ratchet means E comprise a substantially rectilinear lever 27b, playing a role similar to that of arm 27 of the preceding embodiments. This lever 27b is pivotably mounted about pin h; for that lever 27b comprises a bore for centering on this pin h, which is superposed on bore 50. Pawl 25b is provided at the end of lever 27b removed from pin h; pawl 25b is pivotably mounted about a pin 39b which projects from the plane of lever 27b so as to form a stud forming the interaction means with arm 34b of the second ratchet means. Lever 27b is connected, in its middle part, to the end of cable 11. This lever 27b is subjected to a return torque, tending to rotate it in an anticlockwise direction about pin h, by means of a torsion spring 31b.

The second ratchet means G comprise a lever 51 provided with a hole similar to hole 50, for its pivotable mounting on pin h; this lever 51 comprises an extension 53 so as to bear, by means of an adjustable stop screw 54, against support 3; by the play of the different resilient return means, this lever 51 is constantly urged so that extension 53 is maintained in abutment against support 3 so that the lever is locked in relation to support 3.

Lever 51 carries, at its end removed from pin h, the pivotably mounted finger 22b provided, at one end, with bolt 17 intended to penetrate into notches c of piece pb. This finger 22b is urged resiliently into spring rb so as to engage in the notches.

Said arm 34b of the second ratchet means does not form a bend as pronounced as arm 34 in the preceding embodiments. The shape of this arm 34b appears clearly in FIGS. 10 to 12. We find again, at one end of this arm, head 36 and nose 37 forming a means for retaining the notches. This arm 34b is pivotably mounted on pivot 35 carried by bolt 17.

It may be noted that the extension 53 carries another adjustable stop 55 intended to limit the angular travel of lever 27b by cooperation with a part 56 (see FIG. 11) of this lever.

The mounting of the unit formed by the connection means L on the derailleur is illustrated by FIG. 10; it can be seen that it is sufficient to engage the superposed holes of the different elements on pin h then to connect cable 11 to arm 27b. Stop 52 of piece pb remains in abutment against leg 1 because of the action of the conventional return spring (not visible) of the derailleur.

The operation of the device of FIGS. 9 to 12 is similar to that previously described.

The starting position considered is that of FIG. 9.

By actuating the control lever 8 with a movement of the first type, a traction is exerted, in the first phase, on cable 11.

Lever 27b is rotated in a clockwise direction about pin h; pawl 25b, engaged in a notch, rotates piece pb and leg 1 in the same direction about pin h. Member 4 (chain guide) is moved accordingly.

Figure 11:
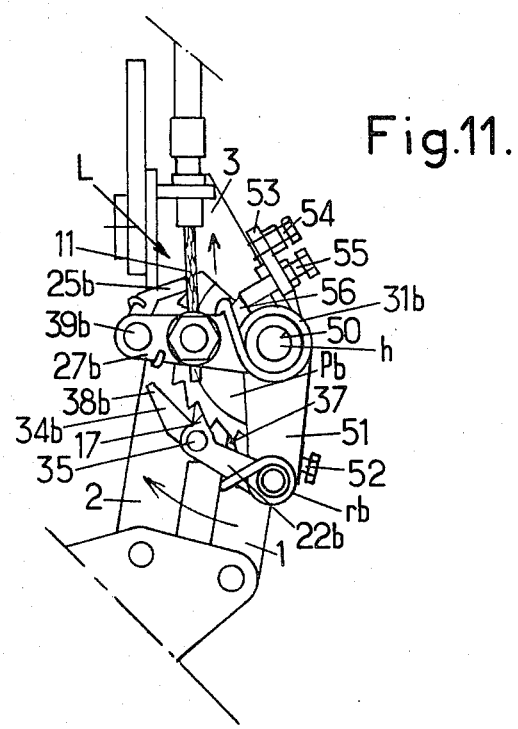
FIGS. 11 and 12 illustrate respectively two operational phases of the device of FIG. 9.

The position of the different elements at the end of the first phase of a movement of the first type is shown in FIG. 11; the position corresponding to that of the immediately higher sprocket has been exceeded so as to facilitate the passage of the chain; this position is determined by part 56 coming into abutment against stop 55; bolt 17 is almost halfway along the inclined face of a notch.

During the second phase of this movement of the first type, the release of the cable allows piece pb to rotate in an anticlockwise direction so that bolt 17 is engaged in the bottom of the notch and guide 6 of the chain takes up the exact position corresponding to the immediately higher sprocket.

Figure 12:
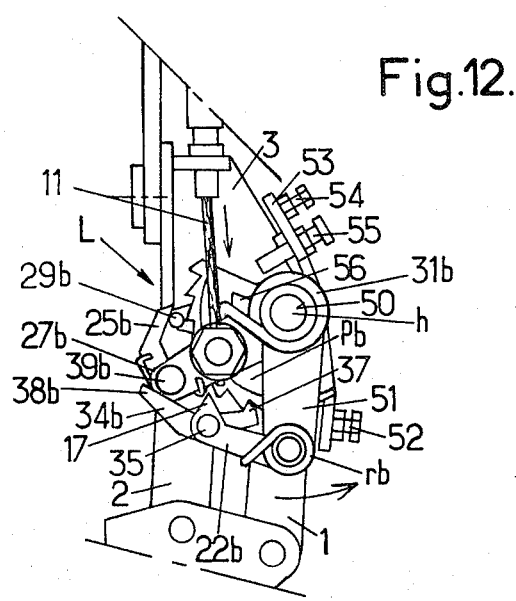
Figure 20:
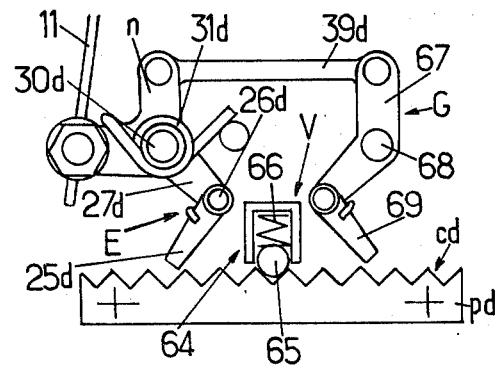
FIG. 20 shows an embodiment for a selector device in which the piece provided with notches is not subjected to a return force.

FIG. 12 illustrates the position of the elements at the end of the first phase of a movement of the second type which corresponds to the passage of the chain from a higher sprocket to the immediately lower sprocket.

At the end of this first phase, because of the release of cable 11, lever 27b urged by spring 31b (this spring bearing against the other lever 51), rotates in an anticlockwise direction about pin h and relatively to lever 51 and piece pb.

Pawl 25b leaves the notch and allows piece pb to rotate in an anticlockwise direction under the action of the return spring of the derailleur.

Peg 39b cooperates with the end 38b of arm 34b so as to rotate this arm 34b, about pivot 35 in an anticlockwise direction which causes nose 37 to engage in a notch so as to retain piece pb at the end of this first phase of the movement of the second type.

The tip of bolt 17 has cleared the top separating two adjacent notches.

During the second phase, bolt 17 penetrates into the next notch and retains piece pb in the new position.

In all the preceding embodiments, during the first phase of a movement of the second type, the bolt is freed from a notch of the piece by a movement in the mean plane of the bolt and of the piece in a direction substantially perpendicular to the direction in which the notches follow one another.

The elements of the device of FIGS. 13 to 19 similar to elements already described are designated by the same references (figures or letters) followed, possibly, by the letter c. The description of this variation will be limited to the modifications worthy of note with respect to the preceding embodiments.

The bolt comprises tooth 17 adapted to engage in the notches of piece pc and a pivotably mounted arm 22c, in a region adjacent its end provided with tooth 17, about a rod 57 parallel to the direction in which the notches c follow each other on piece pc. In this embodiment, bolt 17 also performs the function of pawl 26, and is therefore also labeled in FIG. 13 as 26c, and the part 22c also comprises the connector from the arm 27 to 26c, and is therefore also identified in FIG. 13 as 39c. When this piece is rectilinear, rod 57 is parallel to the mean direction of the piece, as shown in the drawings. Rod 57 is itself pivotably mounted about a pin 58 perpendicular to the plane defined by the mean directions of arm 22c and piece pc.

A spring 59 fulfills a double return role, namely return of rod 57, about pin 58, in an anticlockwise direction when looking at FIGS. 13, 15 and 17, and return of arm 22c about rod 57 in an anticlockwise direction when looking at FIGS. 14, 16 and 18; a stop is provided for maintaining arm 22c in the correct position.

A piece 60, similar to piece pc, but staggered by half a notch in relation to this latter, is placed side by side with this piece, as can be seen in FIG. 19. Thus, the projections separating two adjacent notches of piece 60 appear, in FIGS. 13, 15 and 17, through the notches of piece pc.

The shape of tooth 17 is determined so as to be able to pass into the section 61 defined by two neighboring projections of the two pieces pc and 60, integral with each other.

Piece pc is subjected to a resilient return force, relative to the support (not shown) from left to right in FIGS. 13, 15 and 17, by means of a spring R (FIG. 13).

Pawl 25 may be arranged to cooperate equally either with the notches of piece pc or with the notches of piece 60. Similarly, bolt 17, for the normal position of arm 22c, may cooperate either with the notches of piece pc or with those of piece 60. In the example shown, bolt 17 cooperates, in the normal position, with the notches of piece pc, whereas pawl 25 cooperates with the notches of piece 60.

The cranked arm 27c of the first ratchet means serves as a stop for retaining arm 22c as can be seen in FIGS. 14 and 16. The top part of this arm 22c has a shape such that the movement of arm 22c corresponding to a rotation in a clockwise direction about pin 30c in FIGS. 13 and 15 (first phase of the movement of the first type) does not cause the angular position of arm 22c to vary about rod 57.

On the other hand, arm 22c comprises, towards its lower part, a transverse ramp 62 (FIGS. 14, 16 and 18) adapted to cooperate with arm 27c when this latter rotates in an anticlockwise direction about pin 30c (FIGS. 17 and 18) which corresponds to the first phase of the movement of the second type. Arm 22c is then rotated, in a clockwise direction when looking at FIGS. 16 and 18, about rod 57. Bolt 17 escapes from piece pc by a movement perpendicular to the plane of this piece so as to cooperate with the notches of piece 60. A wall 63 forming a flange is provided on piece 60 for limiting the rotation of arm 22c. Piece pc then moves half a notch towards the right, under the action of the resilient return means, until tooth 17 abuts against the right face k of a notch of piece 60.

The operation of the device of FIGS. 13 to 19 is similar to that already described.

For the movement of the first type of control lever 8, the first phase corresponds to a traction on cable 11 and arm 27c rotates in a clockwise direction about pin 30c; pawl 25 pushes the unit formed by piece pc and piece 60 towards the left when looking at FIGS. 13, 15 and 17. Bolt 17 can clear the projection separating two notches on piece pc due to the possibility of rotation of rod 57 about pin 58.

The position of the different elements towards the end of the first phase of the movement of the first type is shown in FIG. 15; piece pc has moved by about a notch and a half. During the second phase, the piece will take up again its exact position by bolt 17 coming into abutment against the right-hand face 19c of the notch in which it is engaged.

During this movement of the first type, arm 22c has not rotated about rod 57.

During the movement of the second type which begins by releasing cable 11 (FIG. 17) pawl 25 is freed from the notch of the piece and arm 22c rocks, as shown in FIG. 18, so as to pass into a notch of piece 60. Under the action the resilient return force, piece pc and piece 60 move towards the right of FIG. 17 by half a notch until bolt 17 abuts against the right-hand face k of the notch of piece 60.

During the second phase of movement of the second type, arm 22c takes up again the angular position shown in FIGS. 14 and 16 and so engages in the following notch of piece pc; this latter moves by half a notch under the effect of the resilient return force until the right-hand face 19c of its notch abuts against bolt 17.

In all the embodiments described up to now, the piece provided with notches is subjected to a resilient return force and the second ratchet means, as it were, let this piece move by one notch only under the action of the return force.

FIGS. 20 to 23 show schematically an embodiment of the selector device in which, if necessary, no resilient return force is exerted on the piece provided with notches; the second ratchet means are then arranged to control, in a way, positively the movement of the piece for the movement of the second type.

The elements assuming identical roles to elements already described are designated by the same references (figures or letters) possibly followed the letter d.

Locking means V are separate from the second ratchet means G. These locking means V as well as notches cd of piece pd are arranged so as to allow movement of the piece in one direction (from right to left for example when looking at FIGS. 20 to 23) or in the opposite direction, in response to a sufficiently strong action exerted on this piece.

For that, the locking means V are formed, particularly, by a device 64 of the ball type comprising a ball 65 urged by spring 66 to engage in a notch cd of piece pd and to maintain this latter in position. The faces limiting notches cd have opposite slopes, symmetrical in relation to a plane perpendicular to the direction of piece pd.

We find again, for the first ratchet means E, a cranked arm 27d provided with a pawl 25d. The end of cable 11 is fastened to this arm. Arm 27d comprises a radial extension n on which is pivotably mounted a link arm 39d forming means interacting with the second ratchet means G. These second ratchet means are situated, as can be seen in FIGS. 20 to 23, on the side opposite the means E in relation to locking means V. These means G are arranged substantially symmetrically in relation to the plane perpendicular to the mean line of piece pd passing through the locking means V. These means G comprise then an arm 67 pivotably mounted on a fixed pin 68 and provided at its end adjacent piece pd with a pawl 69 intended to work in a counter-direction to pawl 25d. The other end of arm 67 is pivotably mounted at the end of link arm 39d.

Figure 21:
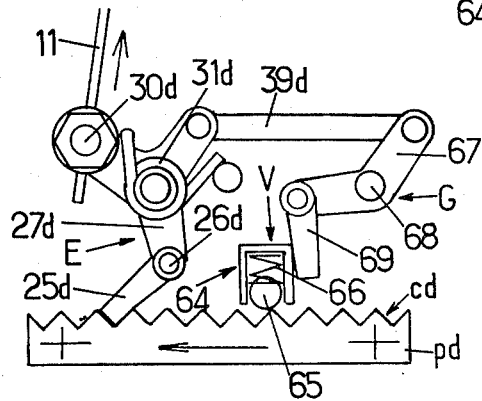
FIGS. 21 to 23 show different operational phases of the device of FIG. 20.
Figure 22:
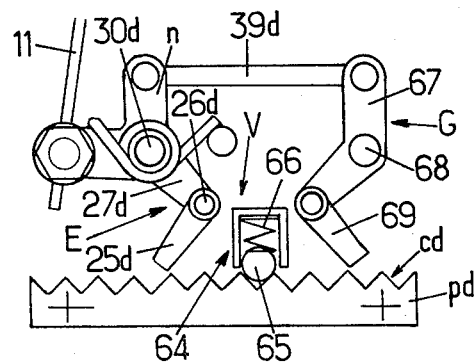
Figure 23:
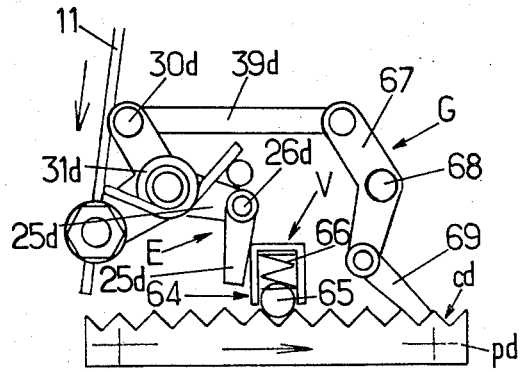

The operation of the device is illustrated in FIGS. 21 to 23. At the end of the first phase of a movement of the first type, the different elements occupy the position shown in FIG. 21, in which pawl 25d is in abutment against the bottom of a notch and has just moved piece pd by about a notch and a half; during the second phase of this first movement, ball 65 comes back into the bottom of the notch and places piece pd in the exact position shown in FIG. 22.

FIG. 23 shows the position of the different elements at the end of the first phase of a movement of the second type. Piece pd has moved, under the action of pawl 69, by a notch towards the right.

During the second phase of the movement of the second type, piece pd does not move.

FIGS. 24 to 32 relate to display means adapted to indicate the position of member 4, at the level of control lever 8. In the case of a derailleur, these display means indicate the rear sprocket on which the chain of the bicycle is engaged.

These display means comprise a rotary cap 70, in the form of a drum, mounted on pin 9 of lever 8; this drum 70 comprises, on the side of lever 8, a track 71 provided with two inverted sets of teeth 72, 73.

The circular base of lever 8 comprises first and second drive means formed respectively by pawls 74 and 75 adapted to cause drum 70 to be driven by lever 8 solely during the first phase of a movement of the first type or of the second type of the lever; drum 70 remains motionless during the second phase of these movements, i.e. during the return of lever 8 to its mean position. A disk 76, fixed in rotation on the pin of lever 8 is placed between this lever and the track of drum 70. This disk 76 comprises two windows 77, 78, extending along arcs of circle having different radii corresponding to the radii of the zones of action of the ends of pawls 74 and 75. These two windows extend on each side of a radius of disk 76. Window 78 allows drum 70 to be driven by pawl 75 and teeth 73 during the first phase of the movement of the first type (lever 8 rotating, during this first phase, in an anticlockwise direction about its pin), disk 76 preventing any action of pawl 74 in this phase. Window 77 allows drum 70 to be driven during the first phase of movement of the second type (lever 8 rotating in a clockwise direction).

The second phases of the movements have no effect on drum 70 because the pawls cooperate with the sloping faces of the sets of teeth 72 or 73.

It should be noted that drum 70 is provided with a friction means 79 (FIG. 29) which ensures, by creation of a friction torque between this drum 70 and the fixed pin of lever 8, that the drum is maintained in position in the second phase of the movements of lever 8.

In zones 80, 81, the sets of teeth 72 and 73 have been omitted (FIG. 30) to ensure that cap 70 stops in maximum position of rotation corresponding to the engaging of the chain either on the largest sprocket or on the smallest sprocket.

Thus, at each movement of lever 8, which corresponds to the passage of the chain from one sprocket to the immediately adjacent sprocket, cap 70 rotates, in relation to a fixed window 82 (FIG. 25) in the suitable direction through a definite angle. Graduations may be provided on this cap 70 so that a figure corresponding to the sprocket on which the chain is engaged appears in this window 82.

If cap 70 is rotated by accident, the normal use of lever 8 allows the position of cap 70 and that of the chain to be synchronized again.

According to a variation, drum 70 could give indications of slope.

The selector device of the invention then allows an accurate position to be ensured for member 4 to be controlled. In fact, this position is determined by cooperation of the notches of piece p . . . pd with the locking means, and not by the position of the control means 8.

This characteristic is particularly advantageous in the case of a bicycle derailleur in which it often happens that difficulties are experienced in maintaining the chain on an intermediate sprocket, when the position of the guide of the chain is determined by the position of control lever 8. The accuracy of control of the selector device remains whatever the number of positions to be controlled.

The control, according to the invention, allows step-by-step passage from one position to the immediately following position without risking the disadvantage of accidentally overstepping this immediately following position. The control device is compact and of a reduced weight.

The accuracy of the positional control of member 4 remains even if cable 11 is stretched.

The amplitude of the movement of member 4 is not limited by the amplitude of the movement of lever 8; in fact, it is sufficient to cause member 4 to effect the required number of steps to obtain the desired amplitude of movement.

Referring to the drawings, and more particularly to FIGS. 33 to 35, there can be seen another embodiment of a rear bicycle sprocket derailleur D equipped with a selector device S. This selector allows the position of chain guide 6 to be remotely controlled relatively to a support formed by a hollow structure casing 101 and constituted by two detachably assembled half-shells. This casing is mounted on a lug P (FIG. 33) fixed to the frame of the bicycle. The control of chain guide 6 is obtained from lever 8 (FIGS. 34 and 35) acting on one end of the tractive cable 11 whose other end is connected to chain guide 6 through connecting means L. Lever 8 is mounted on the frame 10 of the bicycle, for example.

Chain guide 6 comprises two rotary rollers, i.e. an upper roller 102 and a lower roller 103, around which passes chain 5.

The guide chain assembly 6 may pivot about a transverse pin 104 under the action of a resilient return force to maintain a tension in the chain during sprocket changes.

Connecting means L comprise:
 a piece p integral in translation with chain guide 6 and provided with notches c whose number is at least equal to the number of positions to be given to the chain guide;
 and means E, G, for moving piece p and adapted to cooperate with notches c in response to the movements of control lever 8.

The assembly is arranged so that moving means E, G cause, in response to a movement of a first type of lever 8 a movement in a first direction of piece p and, in response to a movement of a second type of lever 8, a movement of piece p in a second direction opposite the first.

For lever 8 to effect the first phase of the movement of the second type, the action of a return force exerted by spring 12 must be overcome.

According to this embodiment, chain guide 6 is slidably mounted on the transverse pivoting pin 104 so that the sliding friction is reduced, and means E, G for moving piece p are arranged to move away from this piece and to release it completely when a sprocket change is completed, the arrangement being such that chain guide 6 may automatically center itself on the desired sprocket under the action of chain 5 subjected to a tension.

Preferably, pivoting shaft 104 is coaxial with the upper roller 102. The end of shaft 104 remote from spokes 105 (FIG. 34) of the bicycle wheel is fixed to casing 101, particularly by means of a screw; shaft 104 extends freely, from this anchorage point, towards the bicycle wheel.

According to a first possibility (FIGS. 34, 35 and 39) the slidable mounting of chain guide 6 is provided by means of a sleeve 106 integral with rotary roller 102; this sleeve extends on the side of roller 102 opposite the wheel.

Chain guide 6 is connected in translation to a socket 107 mounted about sleeve 106, socket 107 is itself connected in translation to this sleeve 106 but is free to rotate in relation to said sleeve. According to a variation, socket 107 may be integral with the chain guide and piece p is mounted freely rotatable on the socket. Roller 102 is supported freely rotatable, on the side of the wheel, by means of a socket 108 mounted on the chain guide.

Piece p provided with notches is integral with socket 107 and extends parallel to shaft 104 as can be seen in FIGS. 34 and 35. Piece p, at its end remote from chain guide 6, carries a guide wheel 109 which cooperates with a guide path (not shown) in casing 101.

The resilient return means 110, 111 exerting the return torque which maintains the tension in the chain are arranged so as to produce no substantial transverse reaction interfering with the sliding. By transverse reaction is meant is meant a reaction orthogonal to shaft 104 or having a component orthogonal to this shaft.

For that, these return means are formed by two springs, respectively 110, 111 (see FIGS. 36 to 38) with return couple in the same direction but with opposite transverse or radial reactions, so as to cancel each other out or practically cancel each other out. The two springs 110, 111 are screwed one in the other as shown in FIG. 36. Spring 110 bears at one end 110a against the chain guide and, at its other end 110b, on piece p, secured against rotation in relation to casing 101; spring 110 thus exerts a torque which tends to rotate chain guide 6 about socket 107 and shaft 104.

Spring 111 bears at one end 111a (FIG. 33) on chain guide 6 and, at its other end 111b (FIG. 34), against a part of casing 101. However, to reduce the friction, due to the fact that spring 111 moves with socket 107, whereas casing 101 is secured against translation, end 111b is provided with a wheel 112 which bears, with rolling possibility, against casing 101.

Because roller 102 and sleeve 106 are rotated by chain 5, the transverse sliding movements of sleeve 106 and roller 102 are facilitated and take place with reduced friction. Furthermore, the arrangement of resilient return means 110, 111 for eliminating or considerably reducing any reaction interfering with the sliding contributes to the ease of the transverse movements.

It is to be noted that this ease of sliding is obtained with extremely simple means according to the solution of FIGS. 34 and 35.

According to a variation shown in FIG. 39, the freedom of socket 107 to rotate in relation to sleeve 106 may be provided by a twin ballring 113 provided at the two axial ends of socket 107.

According to a second possibility, shown in FIG. 40, the reduced friction sliding of chain guide 6 on transverse shaft 104 may be provided by means of a ball socket 114, for axial movements. Roller 102 is then mounted freely rotatable, particularly by means of balls, about this socket 114 which moves essentially by sliding in relation to shaft 104 but not rotating with respect to this shaft.

It is to be noted that in the case of the solution of FIG. 40, the existence of a transverse reaction produced by the resilient return means of chain guide 6 rotating about shaft 104 is less troublesome than in the case of FIGS. 34, 35 and 39 because of the presence of the ball socket 114. Such a socket allows, in fact, reduced friction sliding even in the presence of not inconsiderable forces orientated orthogonally to the sliding direction. In the case of FIG. 40, a single return spring, with non-compensated transverse reaction, could possibly be used.

The means for moving piece p comprise first and second ratchet means E, G adapted to come into play respectively in response to the movements of the first and second types.

When a sprocket change is completed, moving means E, G are completely separated from piece p as can be seen in FIG. 34, so as to entirely release this latter.

The self-centering of chain guide 6, through the action of chain 5, on the desired sprocket, may be achieved because of the low friction sliding of chain guide 6 on shaft 104 and because of the absence of an interfering force connection between piece p and moving means E, G.

As can be seen in FIG. 34, the first and second ratchet means comprise a cranked arm 27e pivotably mounted about a pin 30e carried by casing 101; this arm 27e is common to the first and second ratchet means. A leg 115 of arm 27e passes through an aperture 115a (FIG. 33) provided in casing 101 to project outwardly; this leg 115 is connected to the end of cable 11, preferably by means of a swingle bar system 117 (FIG. 33) with possibility of adjusting the securing point of cable 11.

As can be seen in FIGS. 34 and 35, arm 27e is subjected to the return action, in a clockwise direction about pin 30e, of a torsion spring 31e.

Arm 27e comprises another leg 116, situated inside casing 101 and substantially orthogonal to leg 115. Leg 116, whose end adjacent piece p is enlarged and comprises two longitudinal extensions as can be seen in FIGS. 34 and 35, is provided with two pawls respectively 25e and 69e for working in opposite directions. These pawls, of a cranked shape, as can be seen in FIGS. 34 and 35 are pivotably mounted, in the region of their crank, respectively about a pin 118, 119, carried by leg 116.

The ends of pawls 25e, 69e remote from piece p are connected by interaction means formed by a drawspring 120.

With each pawl 25e, 69e is associated a cam having a ramp 121, 122 partially shown in FIGS. 34 and 35 and adapted to cooperate with a stud 123, 124 integral with the corresponding pawl.

Studs 123, 124 are maintained in abutment against ramps 121, 122 by the return action of drawspring 120.

The shape of ramps 121, 122 is determined so that during rotation of arm 27e about pin 30e, in a specific direction, the ramp of the cam associated with the pawl intended to come into play depending on the direction of rotation of arm 30e, guides this pawl until it cooperates with the corresponding notch c for driving this latter.

Ramps 121, 122 are provided respectively below and above the plane of arm 27e. These ramps are advantageously formed by integrally moulded transverse projections extending inwardly of casing 101, as can be seen in FIG. 41.

Notches c of piece p are advantageously formed by circular holes (FIG. 43) in which the ends, formed respectively by pegs 125, 126, of pawls 25e, 69e are adapted to engage during a movement of arm 27e.

The operation of the device is the following.

This operation will be explained essentially with reference to FIGS. 34 and 35, FIG. 35 illustrating the first phase of a movement of the second type.

In FIG. 34, lever 8 is shown in the mean or rest position, and chain 5 is around the last but one sprocket (in the direction of decreasing diameters).

Chain guide 6 automatically centers itself on this sprocket, under the action of chain 5, because of the low friction sliding of sleeve 106 on shaft 104 and in the absence of any connection between piece p and moving means E, G which are separated from this piece for the rest position.

If it is desired to pass chain 5 from the last but one sprocket, to the smallest sprocket, lever 8 is actuated with the movement of the second type; for that, lever 8 is pushed towards position C (FIG. 35) against the return spring 12. Cable 11 is slackened and spring 31e rotates arm 27e in a clockwise direction, according to the representation of FIG. 35, about pin 30e. During this rotation of arm 27e, pawl 69e approaches piece p; furthermore, the stud 124 of this pawl 69e, by cooperation with ramp 122, under the action of return spring 120, defines the angular position of pawl 69e.

For a sufficient rotation of arm 27e, as shown in FIG. 35, peg 126 of pawl 69e has penetrated into a notch c of piece p. Further rotational movement of arm 27e causes peg 126 to drive piece p in the desired direction, i.e. towards the right in the case of the representation of FIG. 35. It is to be noted that part 122a of the ramp which cooperates, at that time, with stud 124, is parallel to piece p. The same goes for the other ramp 121.

During the second phase of this movement of the second type, i.e. during return of lever 8 from position C to position B, pawl 69e no longer working in the bracing direction, will rotate about pin 118 and free itself from notch c, leaving piece p and chain guide 6 in the position corresponding to the chain being wrapped around the smallest diameter sprocket.

For passing from a larger diameter sprocket, to the immediately smaller sprocket (case of the movement of the second type), there is no point in the position of piece p, at the end of the first phase, going beyond the position corresponding to the correct centering on the immediately smaller sprocket.

On the other hand, when passing from a smaller sprocket to the immediately higher sprocket, it is useful, in order to facilitate the upward movement of the chain over the higher sprocket, to overshoot, at the end of the first phase of the movement of the first type, the position of piece p corresponding to correct centering on the higher sprocket.

The overshoot corresponds advantageously to half a step.

This means that when the chain has been caused to pass from one sprocket to the immediately higher sprocket, at the end of the first phase of the movement of the first type, i.e. when lever 8 is in position A, peg 125, of pawl 25e, engaged in a notch c of piece p, will have pushed this latter beyond the exact centering position; the chain guide 6 will then have a mean plane staggered substantially by half a step towards the mean vertical plane of the wheel, in relation to the plane of the sprocket on which it is desired to cause the chain to pass.

During the second phase of the movement of the first type, chain guide 6, under the action of chain 5, will effect a self-centering movement and will move substantially by half a step towards the outside with respect to the mean vertical plane of the wheel.

It is to be noted that during the movement of the first type, spring 12 does not come into play to oppose the first phase of the movement of lever 8.

The detailed explanation of causing a smaller sprocket to pass to the immediately higher sprocket, during the movement of the first type has not been given in detail for it follows from the explanation given for passing from a higher sprocket to the immediately smaller sprocket. Arm 27e, instead of rotating in the direction shown in FIG. 35, during the first phase, rotates in the opposite direction under the effect of the pull exerted on cable 11.

It is pawl 25e which moves piece p leftwards according to the representation of FIG. 34.

In practice, it has appeared that the self-centering exerted by chain 5 is very satisfactory and that the reduction of friction interfering with the transverse sliding leads to a very smooth control.

However, if it is desired to avoid any risk of sleeve 106 sliding too much under the effect of transverse stresses such as impacts etc., possibly causing creaking of chain 5, whereas lever 8 has not been actuated and no sprocket change has been ordered, additional means 127 may be provided (FIGS. 41 to 43) for locking piece p in a position corresponding to a specific sprocket.

These locking means 127 comprise a rigid blade 128 whose longitudinal direction is substantially orthogonal to that of piece p. This blade is mounted below casing 101 (FIG. 41) on a screw 129 locked against the casing. Screw 129 passes through a hole provided in blade 128; sufficient play is provided between the diameter of the hole of blade 128 and that of screw 129 so as to allow blade 128 to rock about a transverse horizontal axis intersecting the axis of screw 129.

The part of blade 128 located, with respect to screw 129, on the same side as piece p (right-hand part of blade 128 according to the representation of FIG. 41) is longer and has a mass greater than that of the part situated on the other side.

Blade 128 carries at its end located on the same side as piece p a finger 130 adapted to cooperate with sawtooth notches 131 (FIG. 43) provided on the lower edge of piece p. The upper end of finger 130 cooperating with these notches has a dihedral form corresponding to that of the notches (see FIG. 43). Finger 130 passes through an aperture 132 provided in the lower wall of casing 101. The cooperation between finger 130 and this aperture 132 secures blade 128 against rotation in relation to casing 101.

The blade or piece 128 comprises, at its other end, a rounded ended stud 133 adapted to cooperate and to bear on the lower surface of leg 116 of arm 25e, while passing through the wall of the casing.

The lower surface of this part 116 comprises two recesses 134, 135 (FIG. 42) provided in the vicinity of the lateral edges, separated from each other by a central zone 136.

These recesses 134 and 135 are disposed and have a depth such that when arm 27e has rotated in one direction or the other and is at the end of the first phase of a movement of the first or of the second type, stud 133 arrives opposite these recesses.

Because the mass of finger 130 and of blade 128 located on the other side of screw 129 is greater than that of stud 133 and of the other part of blade 128, this blade will rock while rotating in a clockwise direction (according to the representation of FIG. 41), around a horizontal axis perpendicular to the plane of FIG. 9, so that stud 133 comes into contact with the bottom of recess 134 or 135 (FIG. 42). Finger 130 is then completely freed from notches 131.

On the other hand, when arm 27e occupies substantially its mean position, stud 133 cooperates with the central zone 136 and finger 130 is engaged in a notch 131 (FIGS. 41 and 43).

The operation of the locking means of FIGS. 41 to 43 is the following.

When lever 8 is in the mean position, i.e. the position corresponding to chain 5 passing round a specific sprocket, finger 130 is engaged in the notch 131 corresponding to the sprocket in question. This finger 130 is maintained in this notch due to the fact that stud 133 cooperates with zone 136 as previously explained.

Finger 130 prevents therefore piece p and chain guide 6 from moving appreciably under the action of a transverse parasitic stress such as an impact.

It should however be noted that sufficient play may be provided, for example, between the end of finger 130 and the walls of the corresponding notch 131, to leave the chain guide 6 with the possibility of a relatively small clearance, in the transverse direction, so as to allow the self-centering previously mentioned.

When lever 8 is actuated, arm 27e rotates in one direction or the other about pin 30e; the result is that a recess 134, 135 arrives at right angles with stud 133. Blade 128 rocks under the action of gravity and finger 133 penetrates into the recess in question. Finger 130 is freed from notch 131 and piece p may be moved.

The whole is arranged so that finger 130 has freed piece p at the moment when one of the pawls, through its peg 125 or 126, begins to drive this piece p in translation.

The fact that finger 130 is completely freed from notches 131 during a sprocket change, allows, during the change, the position of this sprocket to be overshot without risk of seeing finger 130 engage in a notch which does not correspond to the desired sprocket.

This is particularly advantageous when the chain is passing from a smaller sprocket to the immediately higher sprocket.

In fact, as previously explained, this passing movement which corresponds to a movement of the first type, is facilitated when, at the end of the first phase of the movement of the first type, chain guide 6 and roller 102 have been moved by half a step beyond the exact position corresponding to that of the desired sprocket. This overshooting facilitates the upward movement of the chain onto the sprocket in question.

If finger 130 remained in cooperation with notches 131, at the end of such an overshoot, finger 130 would be at the top of the crest separating two notches 131.

There would then be the risk (due to vibrations, a parasitic transverse force, wear or a lack of accuracy, or from any other cause) of the end of finger 130 passing from the other side of this crest so that the finger would engage in a notch 131 which would not correspond to the desired sprocket.

With the locking means provided in FIGS. 41 to 43, such a risk is completely eliminated since finger 130 only cooperates with notch 131 during the second phase of the movement of the first type, i.e. when piece p will have finished its return movement by about half a step towards the position corresponding exactly to the desired sprocket.

The embodiment shown in FIGS. 33 to 43 allows a derailleur to be obtained having particularly smooth operation. The construction of this derailleur is simplified and leads to a unit whose mass is reduced.

The self-centering of the chain guide on the desired sprocket allows the chain to operate under good conditions.

The cost price is reduced because of the simplified construction.

The selector device is suitable equally for a front derailleur and a rear derailleur.

Control lever 8 may be situated at any appropriate place on the bicycle, for example on the handlebars.

This lever may be replaced by another equivalent control means.

It is clear that different embodiments are possible for the described means. For example, the rocking of blade 128 of the locking means may be provided by the action of a spring instead of gravity.

As an advantage or result of the invention: the mechanical stresses on the parts in operation are reduced when there is no spring for returning the chain guide for the transverse movement.

It is apparent that within the scope of the invention, modifications and different arrangements can be made other than is here disclosed. The present disclosure is merely illustrative with the invention comprehending all variations thereof.

What I claim is:

1. A selector device, especially for a bicycle or a similar chain driven vehicle, for controlling the position of a chain guide in relation to a support to pass a drive chain from one sprocket to a sprocket of a different diameter, through a control means acting at one end of a flexible coupling, the other end of which is connected, by connecting means, to said chain guide, wherein said connecting means between the chain guide and the end of the flexible coupling comprises the following:

defining movement of the control means between a mean position and a first end position as movement of a first type, movement from said mean position to said first end position is a first phase of movement of the first type and a return of the control means from the first end position back to the mean position is a second phase of movement of the first type, and defining movement of the control means between said mean position and a second end position as movement of the second type, movement from said mean position to the second end position is a first phase of movement of the second type, and a return of the control means from the second end position back to the mean position is a second phase of movement of the second type, a piece provided with notches, the number of notches being at least equal to the number of positions to be given to said chain guide, said piece being connected to one of the two elements formed by the chain guide and the support, first ratchet means having a pawl, an arm controlling movement of the pawl, said arm pivotably mounted on the other one of the two said elements, the end of the flexible coupling being attached to said arm, said first ratchet means cooperating with said piece in response to said movement of the control means of the first type, second ratchet means adapted to cooperate with the piece in response to said movement of the control means of the second type, said first and second ratchet means allowing a relative movement notch by notch between the chain guide and the support, and connecting means provided between the said arm and the second ratchet means in order to control movement of the second ratchet means in response to movement of the arm.

2. A selector device according to claim 1, including a spring means for maintaining said control means in said mean position, said spring means being arranged to assist return of the control means to the mean position.

3. A selector device according to claim 1, including a resilient return means for exerting a resilient return force on said arm so as to maintain the flexible coupling under tension and so that when the flexible coupling is slackened, said resilient return means contributes to insure movement of the arm and, through the connecting means, movement of second ratchet means.

4. A selector device according to claim 3 including a spring means for maintaining said control means in the mean position, said spring means having a force greater than that of the resilient return means.

5. A selector device according to claim 1, in which the second ratchet means is controlled by the same arm as the first ratchet means, said connecting means being formed by a part of said arm controlling said first ratchet means.

6. A selector device according to claim 1, in which the connecting means between said arm and said second ratchet means is formed by a link arm.

7. A selector device according to claim 1 in which the connecting means between said arm and said second ratchet means is formed by a peg provided on said arm.

8. A selector device according to claim 1 including means for locking the piece and the chain guide when said piece, chain guide and the arm of first ratchet means are in a position corresponding to a sprocket cooperating with the chain, said arm being arranged to control means for disengaging, when moved, said locking means from the piece and to unlock said piece.

9. The device as claimed in claim 1 resilient return means are provided for generating a return force between the piece and the support.

10. The device as claimed in claim 9, wherein the second ratchet means are arranged to free a bolt from the piece and let this piece move one notch only under the action of the resilient return force.

11. The device as claimed in claim 10, wherein the first ratchet means comprise a pawl adapted to abut against the bottom of a notch of the piece and to drive this piece during the first phase of the movement of the first type, so as to cause the bolt to pass into the next notch.

12. The device as claimed in claim 11, wherein the pawl is carried by the end of an arm pivotably mounted about a pin carried by the support, the end of the flexible coupling being attached to this arm and a resilient return force being exerted on said arm so as to maintain the flexible coupling under tension, the whole being such that the movement of the first type corresponds to a movement of the control means which begins it first phase by a pull exerted on the flexible coupling and then beings its second phase by slackening of the flexible coupling for the return of the control means to its mean position.

13. A device according to claim 10, wherein the second ratchet means are arranged so that, during the first phase of the movement of the second type, the bolt is freed from the face of the notch against which it was in abutment, so that the piece moves under the action of the resilient return force, these second ratchet means comprising stop means adapted to retain the piece when it has traveled substantially half a notch, the second ratchet means causing, during the second phase of the movement of the second type, the bolt to return into the following notch, the stop means releasing the piece.

14. The device as claimed in claim 10, wherein the second ratchet means comprise an arm pivotably mounted about a pivot carried by the bolt, this arm comprising a head provided with a nose adapted to penetrate into a notch adjacent the one cooperating with the bolt, interaction means being provided between this arm and the first ratchet means so that the movements of the first ratchet means cause rotation of this arm, the whole being such that, during the first phase of the movement of the second type, rotation of said arm about the pivot carried by the bolt and the cooperation of the head with the surface of a notch causes the bolt to come out, the nose of the head forming the stop means adapted to retain the piece at the end of the first phase of this movement of the second type, whereas during the second phase of this movement of the second type, the arm assumes the position which allows the bolt to return to the following notch.

15. The device as claimed in claim 1, wherein locking means are provided for cooperating with a notch of the piece, for maintaining this latter in position, said locking means comprising a bolt which may be freed from a notch of the piece by a movement in a plane perpendicular to the direction in which the notches of the piece follow each other.

16. The device as claimed in claim 1, wherein the first ratchet means comprise a pivotably mounted arm provided with a pawl, the end of the cable being secured to this arm, and the second ratchet means also comprise a pivotably mounted arm provided with a pawl intended to work in the opposite direction to the other pawl, these two arms being connected by a link forming interaction means.

17. The device as claimed in claim 1, for controlling the movement of a drive chain passing from one sprocket to a sprocket of a different diameter, wherein the first ratchet means control the movement of the piece provided with notches in the direction which corresponds to the chain passing from a lower sprocket to the immediately higher sprocket, and these first ratchet means are arranged so that at the end of the first phase of the movement of the first type the chain occupies a position beyond the normal position, corresponding to about half a notch of the piece, the return of the chain to a position corresponding to that of the sprocket being obtained during the second phase of the movement of the first type.

18. The device as claimed in claim 1, applied to a bicycle derailleur, wherein said member is formed by or is connected to a guide of the chain of the bicycle whereas the control means is formed by a control lever of the derailleur.

19. The device as claimed in claim 18, wherein there is provided, at the lever of the control means, means for displaying the position of said member.

20. The device as claimed in claim 19, wherein the display means comprise a rotary graduated drum mounted on the pin of the lever, this drum comprising, on the same side as the lever, a track provided with two sets of inverted teeth, the circular base of the lever comprising first and second drive means adapted to rotate the drum by means of the lever, solely during the first phase of a movement of the first type or of the second type, the drum remaining motionless during the second phase of these movements.

21. The selector device as claimed in claim 1 said control means comprising a control lever acting at one end of a flexible coupling, whose other end is connected to the chain guide, through connecting means, the chain guide assembly being pivotable about a pivot pin under the action of a resilient return torque for maintaining a tension in the chain during sprocket changes, comprising:
said piece which is interlocked in translation with the chain guide,
and said first and second ratchet means adapted to cooperate with the notches of this latter in response to the movement of the control lever, the whole being arranged so that the ratchet means ensure, in response to a movement of a first type of the control lever, a movement in a first direction of the piece and, in response to a movement of a second type of the lever, a movement of the piece in a second direction opposite the first, wherein the chain guide is slidably mounted on a transverse shaft and the ratchet means are arranged to move away from this piece and to release it completely when a sprocket change is completed.

22. The selector device as claimed in claim 21, wherein the transverse shaft on which the chain guide is slidably mounted, is formed by the pivot pin of the chain guide.

23. The selector device as claimed in claim 22 for a derailleur whose chain guide comprises two rotary rollers around which the chain passes, wherein the pivot pin of the chain guide is coaxial with the upper roller of, the chain guide.

24. The selector device as claimed in claim 23, wherein the chain guide is slidably mounted, with reduced sliding friction, by providing a sleeve integral with the upper rotary roller, the whole of the sleeve and the roller being rotatable and slidable in relation to the transverse shaft, the chain guide moving with the roller in its translation movement, the resilient return means exerting the return torque which maintains the tension in the chain being arranged so as to produce no substantial transverse reaction interfering with the sliding.

25. The selector device as claimed in claim 24, wherein the resilient recall means with zero or substantially zero transverse reaction are formed by two springs with a recall torque in the same direction, but with opposite transverse or radial effect.

26. The selector device as claimed in claim 21, in which the ratchet means to come into play respectively, in response to the movements of the first and second types of the control lever, wherein these first and second ratchet means comprise a common pivotably mounted arm provided with two pawls working in opposite directions and connected by the interaction means, particularly formed by a spring, the end of the flexible coupling being secured to said arm.

27. The selector device as claimed in claim 26, wherein there is provided, for each pawl, a cam having a ramp cooperating with a stud integral with the pawl and determining the angular position of this pawl under the effect of a resilient return force, the whole being such that during rotation of the arm carrying the pawl, in a specific direction, the ramp of the cam guides the pawl until its peg penetrates into the corresponding notch of the piece to drive this latter.

28. The selector device as claimed in claim 27, wherein means are provided for locking the piece and the chain guide formed by a blade carrying at one end a finger adapted to cooperate with notches provided in the piece and, at its other end, a stud adapted to cooperate with an arm carrying the pawls, the blade being mounted so as to be able to rock and to allow the finger to come out of a notch when the arm has been moved away from its rest position, whereas the cooperation of the stud with the arm when this latter assumes its rest position causes the finger to be introduced into the appropriate notch.

29. A selector device for the remote control of the position of a member relative to a support, through a control means acting at one end of a flexible coupling whose other end is connected, by connecting means, to said member, wherein said connecting means between the member and the end of the flexible coupling comprise:
a piece provided with notches whose number is at least equal to the number of positions to be given to said member;
moving means for moving the piece arranged to cooperate with the notches of this latter in response to the movements of the control means, said piece being connected to one of the two elements formed by the member or the support, whereas the moving means are connected to the other one of these two elements, the moving means being arranged so that in response to a movement between the support and the member in a first direction, and, in response to a movement of a second type of the control means, said moving means ensure a relative movement between the support and the member in a second direction opposite the first direction,
movement of the first type of control means corresponding to a movement of said control means in a first phase from a mean position to a first end position and in a second phase from the first end position back to the mean position, whereas the movement of the second type corresponds to a movement of this control means in a first phase from the mean position to a second end position and in a second phase from the second end position back to the mean position,
said device being a bicycle derailleur, wherein said member is formed by or is connected to a guide of the chain of the bicycle, whereas the control means is formed by a control lever of the derailleur, and including at the lever of the control means, a means for displaying the position of said member, said display means comprising a rotary graduated drum mounted on the pin of the lever, this drum comprising, on the same side as the lever, a track provided with two sets of inverted teeth, the circular base of the lever comprising first and second drive means adapted to rotate the drum by means of the lever, solely during the first phase of a movement of the first type or of the second type, the drum remaining motionless during the second phase of these movements.

30. A selector device for a chain driven vehicle for controlling the position of a chain guide to in turn select one of a plurality of different diameter coaxial sprockets to drivingly engage the chain, comprising:

the arrangement wherein said chain guide is movable stepwise in one direction to move the chain to successively larger sprockets, and said chain guard is movable stepwise in the opposite direction to move the chain to successively smaller sprockets, a control lever located remote from the chain guide and operatively connected thereto via a flexible coupling, the control lever having a mean position, and two end positions on opposite sides from said mean position, a moving means operatively connected on the one hand to the flexible coupling and on the other hand to the chain guide, said moving means comprising means for moving the chain guide, (a) through a plurality of steps to successively larger sprockets, but only one step at a time upon each movement of the control lever from the mean position to the first end position and back to the mean position; and (b) to move the chain through a plurality of steps to successively smaller sprockets, but only one step at a time, upon each movement of the control lever from the mean position to the second end position and back to the mean position, and including a means located at the control lever for displaying the position of said chain guide, the display means comprising a rotary graduated drum mounted on the pin of the lever, this drum comprising, on the same side as the lever, a track provided with two sets of inverted teeth, the circular base of the lever comprising first and second drive means adapted to rotate the drum by means of the lever, solely during movement of the control lever from said mean position to each of said end position, while remaining motionless as the lever moves from said end positions back to said mean position.

31. A selector drive for a chain driven vehicle for controlling the position of a chain guide to in turn select one of a plurality of different diameter coaxial sprockets to drivingly engage the chain, comprising:

the arrangement wherein said chain guide is movable stepwise in one direction to move the chain to successively larger sprockets, and said chain guard is movable stepwise in the opposite direction to move the chain to successively smaller sprockets, a control lever located remote from the chain guide and operatively connected thereto via a flexible coupling, the control lever having a mean position, and two end positions on opposite sides from said mean position, and a moving means operatively connected on the one hand to the flexible coupling and on the other hand to the chain guide, said moving means comprising means for moving the chain guide, (a) through a plurality of steps to successively larger sprockets, but only one step at a time upon each movement of the control lever from the mean position to the first end position and back to the mean position; and (b) to move the chain through a plurality of steps to successively smaller sprockets, but only one step at a time, upon each movement of the control lever from the mean position to the second end position and back to the mean position, said moving means comprising a piece having notches and operatively connected to the chain guide such that movement of the piece in one direction moves the chain guide and hence the chain to engage larger diameter sprockets, and movement of the teeth in the opposite direction moves the chain guide, and hence the chain, to engage small diameter sprockets, and a pair of ratchet means operatively engaging the flexible coupling with the notches of the piece.

32. A selector device according to claim 31, wherein during movement of the chain guide in the direction towards the larger sprockets, the chain guide and hence the chain move more than one step as the control lever moves from the mean position out to the first end position, after which the chain moves back to its respective sprocket at the said one step position as the control lever moves back from the said first end position to the mean position.

* * * * *